(12) United States Patent
Agrawal et al.

(10) Patent No.: US 10,326,508 B2
(45) Date of Patent: Jun. 18, 2019

(54) BEAM FORMING METHOD FOR A TRANSMITTING ANTENNA AND A DEVICE THEREOF

(71) Applicants: Samsung Electronics Co., Ltd., Suwon-si, Gyeonggi-do (KR); DELHI TECHNOLOGICAL UNIVERSITY, New Delhi (IN)

(72) Inventors: Sachin Kumar Agrawal, Ghaziabad (IN); Kapil Sharma, Delhi (IN)

(73) Assignees: Samsung Electonics Co., Ltd., Suwon-si (KR); Delhi Technological University, New Delhi (IN)

( * ) Notice: Subject to any disclaimer, the term of this patent is extended or adjusted under 35 U.S.C. 154(b) by 0 days.

(21) Appl. No.: 15/975,162

(22) Filed: May 9, 2018

(65) Prior Publication Data
US 2018/0331738 A1    Nov. 15, 2018

(30) Foreign Application Priority Data

May 11, 2017 (IN) .............................. 201711016629

(51) Int. Cl.
| *H04B 7/06* | (2006.01) |
| *H04B 7/08* | (2006.01) |
| *H04L 5/00* | (2006.01) |
| *H04B 7/0456* | (2017.01) |

(52) U.S. Cl.
CPC ......... *H04B 7/0608* (2013.01); *H04B 7/0617* (2013.01); *H04B 7/0695* (2013.01); *H04B 7/0802* (2013.01); *H04B 7/0456* (2013.01); *H04L 5/0026* (2013.01); *H04L 5/0048* (2013.01)

(58) Field of Classification Search
USPC .......................................................... 375/267
See application file for complete search history.

(56) References Cited

U.S. PATENT DOCUMENTS

| 8,948,327 | B2 | 2/2015 | Kludt et al. | |
| 9,246,216 | B2 | 1/2016 | Harel et al. | |
| 2014/0185719 | A1 | 7/2014 | Kludt et al. | |
| 2014/0348255 | A1* | 11/2014 | Lorca Hernando | H04B 7/0452 375/267 |
| 2015/0054679 | A1* | 2/2015 | Ahmed | G01S 7/411 342/25 A |
| 2015/0138992 | A1 | 5/2015 | Jover | |
| 2016/0327634 | A1 | 11/2016 | Katz et al. | |
| 2016/0365900 | A1 | 12/2016 | Kim et al. | |
| 2017/0012692 | A1 | 1/2017 | Kim et al. | |
| 2017/0040685 | A1 | 2/2017 | Chang et al. | |

* cited by examiner

*Primary Examiner* — Eva Y Puente
(74) *Attorney, Agent, or Firm* — Jefferson IP Law, LLP

(57) ABSTRACT

A method and a device for beam forming in cellular communication systems are provided. The method includes creating a virtual three-dimensional shape around the transmitting antenna, selecting at least one face from among a plurality of faces of the virtual three-dimensional shape based on a first set of parameters, creating one or more grids on the at least one selected face, selecting at least one grid from among the one or more grids as an optimum grid set based on a second set of parameters, and forming at least one beam based on the at least one grid.

24 Claims, 14 Drawing Sheets

BEAM FORMING METHOD FOR A TRANSMITTING ANTENNA AND A DEVICE THEREOF

CROSS-REFERENCE TO RELATED APPLICATION

This application is based on and claims priority under 35 U.S.C. § 119(a) of an Indian patent application number 201711016629, filed on May 11, 2017, in the Indian Intellectual Property Office, the disclosure of which is incorporated by reference herein in its entirety.

BACKGROUND

1. Field

The disclosure relates to a method and device for beam forming in cellular communication systems. More particularly, the disclosure relates to selecting an antenna for beam forming based on obstructions.

2. Description of Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a cellular communication system that supports beam forming, a base station and a terminal may form a plurality of beams for signal transmission and reception. Particularly, each of the base station and the terminal may select an optimal beam of a plurality of beams according to a beam forming protocol, and transmit and receive a signal using the selected beam. In general, the beam forming protocol includes a beam tracking procedure that is performed continuously in a background. The beam tracking procedure involves scanning a wide spectrum of reflected signals to obtain relevant parameters for optimal beam forming, thereby increasing time, load, and power consumption.

Thus, there exists a need for a solution to overcome above-mentioned deficiencies.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a selection of concepts in a simplified format that are further described in the detailed description of the disclosure. This summary is not intended to identify key or essential inventive concepts of the claimed subject matter, nor is it intended for determining the scope of the claimed subject matter.

In accordance with an aspect of the disclosure, the method and the device for beam forming in cellular communication systems are provided. The method and the device includes selecting an antenna for beam forming based on obstructions.

In an embodiment of the disclosure, a beam is formed for a transmitting antenna. Accordingly, a virtual three-dimensional shape is created around the transmitting antenna. Thereafter, at least one face from among a plurality of faces of the virtual three-dimensional shape is selected based on a first set of parameters. One or more grids are then created on the at least one selected face. The one or more grids divide a face of the virtual three-dimensional shape into an n by m matrix, wherein a value of n is equal to or more than one (1); and a value of m is equal to or more than one (1). At least one grid is then selected from among the one or more grids as an optimum grid set based on a second set of parameters. Based on the at least one grid, at least one beam is formed.

The advantages of the disclosure include, but not limited to, forming an efficient and high direction beam based on at the optimum grid set with minimal losses. Further, by creating a virtual three-dimensional shape and creating the at least one grid on at least one face of the virtual three-dimensional shape, a three-dimensional beam forming is facilitated. Thereby, the beam formation is highly directional. This further reduces complexity of the cellular communication systems and optimizes performance parameters. Further, time, load, and power consumption for beam forming may be considerably reduced, as the beam is formed based on the at least one selected grid rather than linear scanning.

These aspects and advantages will be more clearly understood from the following detailed description taken in conjunction with the accompanying drawings and claims.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

To further clarify advantages and aspects of the disclosure, a more particular description of the disclosure will be rendered by reference to specific embodiments thereof, which is illustrated in the appended drawings. It is appreciated that these drawings depict only typical embodiments of the disclosure and are therefore not to be considered limiting its scope. The disclosure will be described and explained with additional specificity and detail with the accompanying drawings, which are listed below for quick reference.

Figure 1:
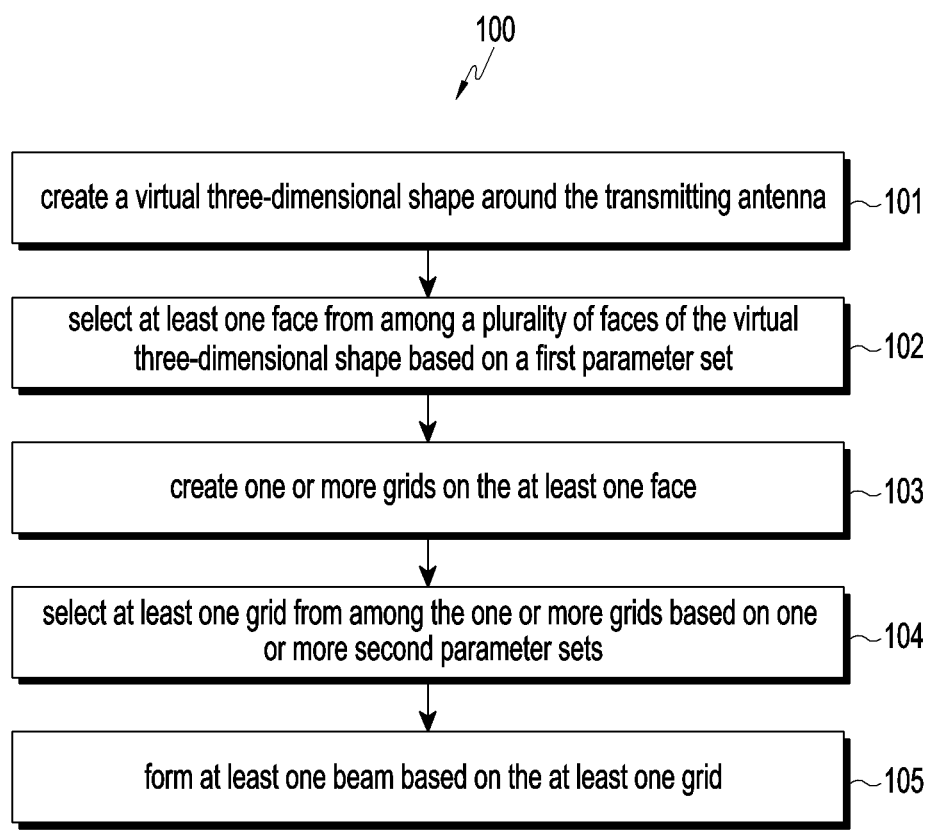
FIGS. 1, 2, 3, 4, 5, and 6 illustrates method for beam forming for a transmitting antenna, according to various embodiments of the disclosure.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the disclosure. Furthermore, the one or more elements may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Certain terms or phrases used herein may be defined merely for ease of description. For example, the terms "include" and "comprise" and their derivatives may indicate doing so without any limitations. As used herein, the term "or" may be used interchangeably with the term "and/or." As used herein, the phrases "associated with," "associated therewith" and their derivatives may be used interchangeably with the terms "include," "be included within," "interconnect with," "contain," "be contained within," "connect to or with," "couple to or with," "be communicable with," "cooperate with," "interleave," "juxtapose," "be proximate to, "be bound to or with, "have, and "have a property of." As used herein, the term "controller" may indicate any device, system, or part thereof controlling at least one operation. As used herein, the term "device" may indicate a device that may be implemented in hardware, firmware, software, and some combination of at least two thereof. It should be noted that functions, whatever certain controller is associated therewith, may be concentrated, distributed, and implemented locally or remotely. It should be appreciated by one of ordinary skill in the art that the definitions of certain terms or phrases as used herein may be adopted for the present or the future in many cases.

The terms coming with ordinal numbers such as "first" and "second" may be used to denote various components, but the components are not intended to be limited by the terms. The terms are used only to distinguish one component from another. For example, a first component may be referred to as a second component, and vice versa without departing from the scope of the present disclosure. The term "and/or" may refer to a combination(s) of a plurality of related items as listed or any of the items.

The terms as used herein are provided merely to describe embodiments of the present disclosure, but are not intended to limit the present disclosure. It will be further understood that the terms "comprise" and/or "have," when used in the present disclosure, indicate the presence of stated features, integers, steps, operations, elements, and/or components, but do not preclude the presence or addition of one or more other features, integers, steps, operations, elements, components, and/or groups thereof.

It should be understood at the outset that although illustrative implementations of the embodiments of the disclosure are illustrated below, the disclosure may be implemented using any number of techniques, whether currently known or in existence. The disclosure should in no way be limited to the illustrative implementations, drawings, and techniques illustrated below, including the design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

FIGS. 1, 2, 3, 4, 5, and 6 illustrates method for beam forming for a transmitting antenna, according to various embodiments of the disclosure. FIG. 7 illustrates device implementing the method for beam forming according to the embodiment of the disclosure.

Referring to FIG. 1 and FIG. 7, a beam forming method 100 and a device 700 implementing the beam forming method for a transmitting antenna 701 are described. To implement the method 100, the device 700 includes a controller 702. The controller 702 may be at least one processor. Examples of the transmitting antenna 701 can include, but not limited to, a beam antenna and an array antenna that can form one or more beams in a specific direction. The transmitting antenna 701 can be integral part of a user terminal such as a smart phone, wearable devices, a virtual reality (VR) device, a base station, a vehicle, unmanned aerial vehicles (UAVs), low earth orbit (LEO) satellites, autonomous small size robot such as drones, radar, internet of things (IoT) devices such as wireless modems and smart TV, etc. As such, the device 700 can also be integral to the user terminal, the base station, the vehicle, the UAVs, the LEO satellites, the autonomous small size robot, radar and the IoT devices. The transmitting antenna 701 transmits a signal in a direction of a receiving antenna (not shown in the figure). The receiving antenna can be integral part of a user terminal such as smart phone, wearable devices, a VR device, a base station, a vehicle, UAVs, (LEO satellites, an autonomous small size robot such as drones, radar, IoT devices such as wireless modems, and smart TV, etc.

At operation 101 of FIG. 1, a virtual three-dimensional shape is created around the transmitting antenna. The transmitting antenna may be included in a base station. The virtual three-dimensional (3D) shape can be any three-dimensional polygon having a plurality of faces. Examples of such three-dimensional polygon include, but not limited to, cube, pyramid, L-cube, etc.

At operation 102, at least one face may be selected from among a plurality of faces of the virtual three-dimensional shape based on a first set of parameters. The first set of parameters include, but not limited to, channel sense information, data related to the transmitting antenna, data related to a receiving antenna, a direction of the receiving antenna, cellular information, and user-input.

To create the virtual three-dimensional shape and select the at least one face, the controller 702 includes a shape creating and selecting unit (SCSU) 703. The SCSU 703 creates the virtual three-dimensional shape around the transmitting antenna. Thereafter, the SCSU 703 obtains the first set of parameters and selects at least one face based on the first set of parameters.

At operation 103, one or more grids are created on the at least one selected face. The one or more grids divide a face of the virtual three-dimensional shape into an n by m matrix, wherein a value of n is equal to or more than one (1); and a value of m is equal to or more than one (1).

At operation 104, at least one grid may be selected from among the one or more grids as an optimum grid set based on a second set of parameters. The second set of parameters includes attenuation, propagation delay, network efficiency, quality of service (QoS), latency, signal-to-noise ratio (SNR), channel capacity, and signal-to-interference ratio.

To this end, the controller 702 includes a grid creator and selector unit (GCSU) 704. The GCSU 704 creates the one or more grids on the at least one selected face and selects the at least one grid based on the second set of the parameters.

At operation 105, at least one beam is formed based on the optimum grid set. As would be understood, beam forming is used to direct and steer an antenna's directivity beam in a particular direction. The optimum grid set allows formation of beam in a direction of a particular location with minimal attenuation/losses, thereby allowing control over shape and steering of antenna's directivity pattern. Thus, formation of the at least one beam based on the optimum grid set generates a high directional and efficient beam with minimal losses and overheads.

To form the at least one beam at operation 105, the device 700 includes a beam-forming unit (BFU) 705. The BFU 705 forms at least one beam in accordance with the input, i.e., the at least one optimum grid, provided by the controller 702. The BFU 705 can be included within a transmitting and receiving unit (TRU) 706. The TRU 706 controls and performs a function of transmitting a signal to the receiving antenna through the at least one beam formed by the BFU 705. The transmitting antenna 701 then transmits the signal in the direction of the receiving antenna.

Further, during the formation of the at least one beam at operation 102, the BFU 705 can employ various techniques as known in the art to form the beam. Examples of such techniques include analogue beam forming technique using a phase shifter, digital beam forming technique, hybrid beam forming technique, and physically moving the transmitting antenna to a previously defined direction. Examples of the digital beam forming technique include fixed beam forming technique, adaptive beam forming technique, azimuth beam forming technique, and elevation beam forming technique. Fixed beam forming technique is typically used when signal source location and noise source location is fixed with respect to the transmitting antenna 701. Examples of fixed beam forming technique include, but not limited to, Delay-and-Sum, Filter-and-Sum, and Weighted-Sum based technique. Adaptive beam forming technique is typically used when signal source location and noise source location are moving with respect to the transmitting antenna 701. Examples adaptive beam forming technique includes, but not limited to, generalised sidelobe canceller (GSC), linearly constrained minimum variance (LCMV, Frost), in situ calibrated microphone array (ICMA), and minimum mean squared error (MMSE).

Figure 2:
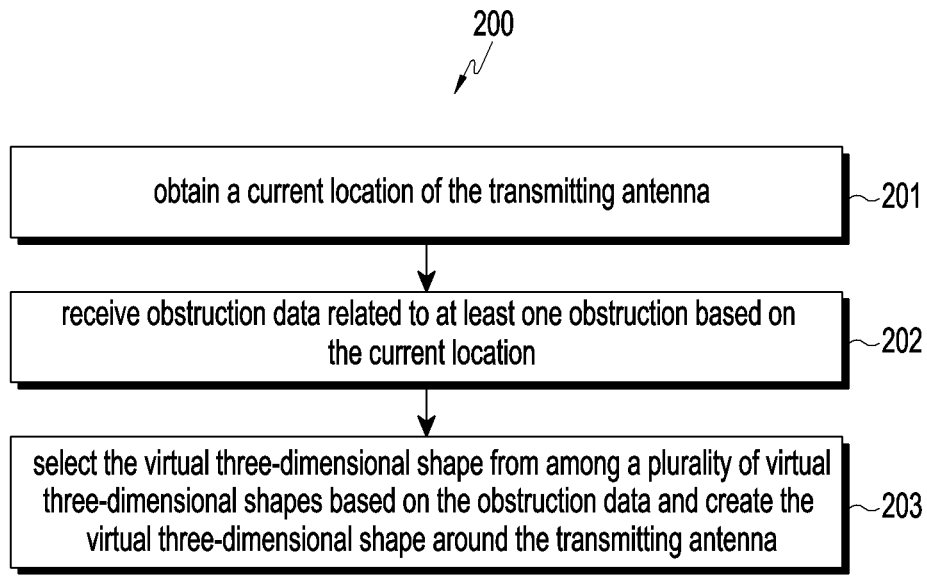

Referring to FIG. 1, in accordance with the disclosure, the creation of the virtual three-dimensional shape, as defined at operation 101, is performed by implementing operations of method 200 as described in FIG. 2. Thus, referring to FIG. 2 and FIG. 7, the device 700 implementing the beam forming method are described below.

Accordingly, to create the virtual three-dimensional shape, a current location of the transmitting antenna is determined at operation 201 of FIG. 2.

In one implementation, the current location is determined based on dynamic determination of geolocation of the transmitting antenna. In such implementation, referring to FIG. 7, the controller 702 includes a location detection unit (LDU) 707 to determine the current location. The LDU 707 dynamically detects the current location of the transmitting antenna 701 using various techniques as known in the art. As described earlier, the device 700 and the transmitting antenna 701 can be an integral part of the user terminal, the base station, the vehicle, the autonomous small size robot, and the IoT devices. As such, the LDU 707 can detect the current location using techniques such as, but not limited to, inbuilt-global positioning system (GPS) sensor, GPS techniques, deriving geo-location from an IP address, an indoor position system (IPS), local positioning system (LPS), base station assisted (BS assisted) position determination technique, mobile station assisted (MS assisted) reverse position determination technique, etc. As would be understood, the IPS can be based on various technologies.

In another implementation, the current location is determined based on user-input. In such implementation, referring to FIG. 4, the controller 702 includes a user-input receiving unit (UIRU) 708 to receive the user-input. In one example of such implementation, the user-input can be a text data indicating the current location. In one example of such implementation, the user-input can be touch-based input indicating the current location. Accordingly, in such implementation, the SCSU 703 can provide a user-interface on a display unit (not shown in the figure) communicatively coupled with the device 700. The display unit can be integral part of or external to the user terminal, the base station, the vehicle, the UAVs, the LEO satellites, the autonomous small size robot, and the IoT devices. In one example, the user-interface can provide text field(s) to input text data indicating the current location. In another example, the user-interface can provide a list to select the current location. The UIRU 708 can receive the user-input a provided through the user-interface via input unit (not shown in the figure and communicatively coupled to the device 700).

Upon determining the current location, at operation 202, data related to at least one obstruction is received based on the current location thus determined. The obstruction(s) can be manmade obstruction(s) or natural obstruction(s). Examples of the obstruction include, but not limited to, buildings/high-rise structures, trees, vegetation, vehicles, rain, clouds, fog, smog, other weather condition, and a human body. As such, the received data related to the at least one obstruction includes type of obstruction present at or available in proximate to the determined current location and characteristics of the at least one obstruction. The characteristics include depth of the at least one obstruction, a width of the at least one obstruction, and a property of the at least one obstruction such as material and movable/static.

In one implementation, the data is received or fetched from a storage unit. Accordingly, the controller 702 includes a data-fetching unit (DFU) 709 to fetch above-mentioned data from a storage unit 710 upon determining the current location of the transmitting antenna 701. The storage unit 710 stores the data related to at least one obstruction as obstruction data 711. Such obstruction data 711 can be determined, evaluated or processed prior to the current instance of time. In addition, such obstruction data 711 can be determined, evaluated or processed for various terminals/devices/systems used by various users and having the device 700 prior to the current instance of time and stored in the storage unit 710. In addition, such obstruction data 711 can be obtained from system(s) capable of predicting/forecasting obstruction details such as future building projects and weather condition at later instance of time. In one implementation, the storage unit 710 can be internal to the device 700. In one example of such implementation, the device 700 and the storage unit 710 can be integral to a base station. In another implementation, the storage unit 710 can be external to the device 700, as illustrated in the figure. In one example of such implementation, the device 700 can be integral to a user terminal and the storage unit 710 can be associated with a network operator.

Further, in one implementation, the data is obtained from at least one reflected signal received from the current location. Accordingly, the SCSU 703 obtains the reflected signal using various techniques as known in the art. In one example, the SCSU 703 obtains the reflected signals using 3D scanning technique. In one example, the SCSU 703 obtains the reflected signals using 2D scanning technique. Upon obtaining the reflected signal, the SCSU 703 obtains the at least one parameter of the received signal using techniques as known in the art. The at least one parameter of the reflected signal includes an intensity, angle of arrival (AOA), elevation angle, azimuth angle, frequency/Doppler shift, time of arrival (TOA), time difference of arrival (TDOA), power of the signal, signal to noise ratio, signal to interference plus noise ratio, interference, offset, coherent energy, incoherent energy, variance, and correlation. Upon obtaining the at least one parameter, the SCSU 703 derives the characteristics of the at least one obstruction, if any, present in the current location from where reflected signals are being received using techniques as known in the art. The characteristics include depth of the at least one obstruction, a width of the at least one obstruction, and a property of the at least one obstruction.

In one implementation, the data is obtained based on user-input. In such implementation, the SCSU 703 can provide a user-interface on the display unit (not shown in the figure) to receive the user-input. The user-input is received by the UIRU 708 via a user-interface and consequently the SCSU 703 derives the characteristics of the at least one obstruction.

Upon receiving the data related to at least one obstruction, the SCSU 703 selects and creates the virtual three-dimensional shape based on the received data in operation 203. The virtual three-dimensional shape is selected and created such that the the transmitting antenna 701 is at center of the virtual three-dimensional shape. Further, the virtual three-dimensional shape is selected and created such that the distance from the center of virtual three-dimensional shape to a face of the three-dimensional shape is a minimum distance between the transmitting antenna 701 and the at least one obstruction.

To this end, the SCSU 703 determines a nearest obstruction in the current location based on the received data and determines a minimum distance between the transmitting antenna 701 and the nearest obstruction. The determined minimum distance is calculated on all sides/directions of the transmitting antenna 701. Based on the determined minimum distance, the SCSU 703 selects the virtual three-dimensional shape from among a plurality of three-dimensional shapes and creates the virtual three-dimensional shape around the transmitting antenna 701. The virtual three-dimensional shape is having a plurality of faces and is created such that the transmitting antenna 701 is at the center from each of the faces at a distance equal to the minimum distance. The virtual three-dimensional shape can be created using techniques as known in the art. In an example, the virtual three-dimensional shape can be a cube based on the received data. In an example, the virtual three-dimensional shape can be a pyramid based on the received data. Thus, the virtual three-dimensional shape indicates an obstruction free area around the transmitting antenna 701 at the current location for beam forming such that obstruction free area reduces interference and distortion of the beam due to the obstructions during signal transmission and avoids communication dead zones. In accordance with the disclosure, referring to FIG. 1, upon creating the virtual three-dimensional shape, at least one face is selected from among the plurality of faces at operation 102 based on the first set of parameters. Accordingly, the SCSU 703 obtains values of the first set of parameters using various techniques. As described earlier, the first set of parameters include, but not limited to, channel sense information, data related to the transmitting antenna, data related to a receiving antenna, a direction of the receiving antenna, cellular information, and user-input. In one example, the SCSU 703 obtains channel sense information by sensing whether there is signal energy at the frequency bands designated for transmission. In on example, the SCSU 703 obtains direction of the receiving antenna as a user-input via the UIRU 708. In one another example, the SCSU 703 obtains selection of the face(s) itself as a user-input via the UIRU 708. Based on the values of the first set of parameters, the SCSU 703 selects at least one face of the virtual three-dimensional shape in the direction of the receiving antenna with minimal attenuation/losses due to the obstructions. In one example, the three-dimensional shape is a cube with six faces and the selected faces can be two adjacent side faces based on the values of the first set of parameters. Thus, the selected faces(s) can be a specific zone or geographical area (within the total obstruction free area represented by the virtual three-dimensional shape) that has minimal obstruction(s) and consequently provides minimal propagation/path losses during transmission of signals. In one example, the zone can be geographical area covered by a single cell within the obstruction free area. In one example, the zone can be a small geographical area within a larger area covered by the obstruction free area.

Further, referring to FIG. 1, one or more grids are created on the selected at least one face at operation 103. Accordingly, based on the values of the first set of parameters and the received data, the GCSU 704 divides the at least one selected face of the virtual three-dimensional shape into an n by m matrix that form the one or more grids. A value of n is equal to or more than 1; and a value of m is equal to or more than 1. In one implementation, the GCSU 704 obtains the values of the first set of parameters and the received data from the SCSU 703. In one implementation, the GCSU 704 obtains the values of the first set of parameters and the received data in a similar manner as the SCSU 703 obtains the values of the first set of parameters and the received data, as described above. In one implementation, the GCSU 704 divides the at least one selected face into the n-by-m matrix based on a size of the at least one selected face. In one implementation, the GCSU 704 divides the at least one selected face into the n-by-m matrix based on a user-input. The user-input can be indicative of the number of grids to be formed and/or the size of the matrix, i.e., values of n and m. In one example of such implementation, the user-input can be a text data indicating the number of grids to be formed and/or the size of the matrix. In one example of such implementation, the user-input can be touch-based input indicating the number of grids to be formed and/or the size of the matrix. Accordingly, in such implementation, the GCSU 704 can provide a user-interface on the display unit (not shown in the figure). In one example, the user-interface can provide text field(s) to input text data indicating the number of grids to be formed and/or the size of the matrix. In another example, the user-interface can provide a list to select the number of grids to be formed and/or the size of the matrix. The UIRU 708 can receive the user-input provided through the user-interface via the input unit (not shown in the figure and communicatively coupled to the device 700). In this manner, the GCSU 704 further divides the specific zone or area into smaller zones or areas that have negligible obstruction(s) and consequently provides negligible propagation/path losses during transmission of signals. In one example, the smaller zones can small geographic area within the single cell. It would be understood that a 3D beam forming improves cell average and edge grid throughput, and eliminates interference to adjacent cells by combining elevation beam forming and azimuth beam forming. Thus, the creation of one or more grids enhances the performance of the 3D beam forming. Although, only one (1) grid from 1-×-1 matrix or four (4) grids from a 2×2 matrix can be formed, it would be understood that greater the number of grids created on the face, the higher is the improvement in the performance of 3D beam forming.

Figure 3:
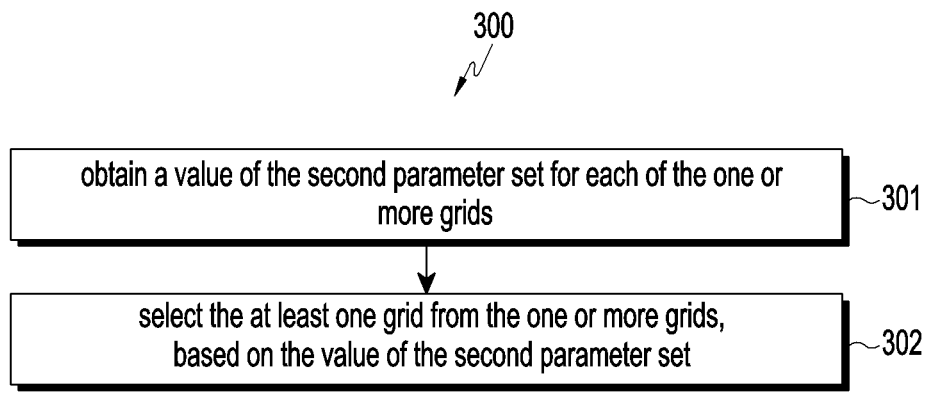
Figure 4:
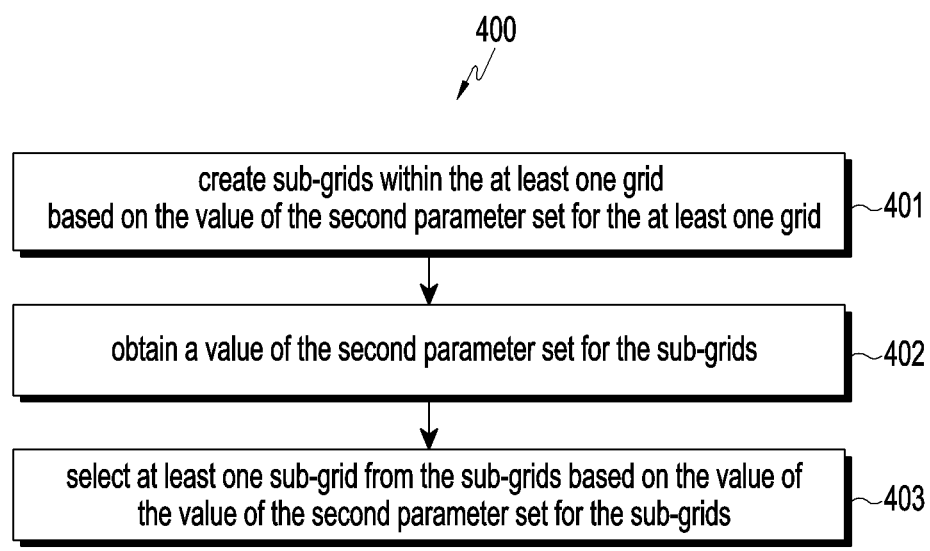
Figure 5:
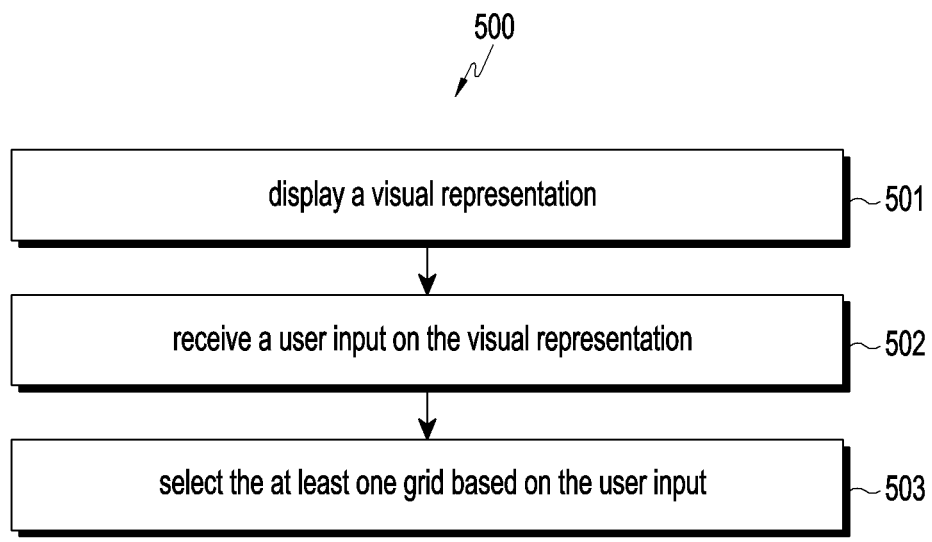

Referring to FIG. 1, the selection of at least one grid from among the one or more grids as the optimum grid set based on the second set of parameters, as defined at operation 104, is performed by implementing operations of method 300, 400, and 500 as described in FIGS. 3, 4, and 5, respectively. Thus, referring to FIGS. 3, 4, and 5, and FIG. 7, the device 700 implementing the beam forming method are described below.

Accordingly, at operation 301 of FIG. 3, a value of the second set of parameters for each of the one or more grids is determined. As described earlier, the second set of parameters include, but not limited to, attenuation, propagation delay, network efficiency, quality of service (QoS), latency, signal-to-noise ratio (SNR), channel capacity, and signal-to-interference ratio. The attenuation can be channel impairment attenuation or channel impairment dynamic attenuation.

In one implementation, the value of the second set of parameters can be determined/obtained from at least one reflected signal received from the current location. Accordingly, the GCSU 704 receives at least one reflected signal from the one or more grids using various techniques as known in the art. In one example, the GCSU 704 obtains/receives the reflected signals using 3D scanning technique. In one example, the GCSU 704 obtains/receives the reflected signals using 2D scanning technique. Upon obtaining the reflected signal, the GCSU 704 obtains the at least one parameter of the received signal using techniques as known in the art. The at least one parameter of the reflected signal includes an intensity, AOA, elevation angle, azimuth angle, frequency/Doppler shift, TOA, TDOA, power of the signal, signal to noise ratio, signal to interference plus noise ratio, interference, offset, coherent energy, incoherent energy, variance, and correlation. Upon obtaining the at least one parameter of the reflected signal, the GCSU 704 derives the characteristics of the at least one obstruction, if any, present in the current location from where reflected signals are being received using techniques as known in the art. The characteristics include depth of the at least one obstruction, a width of the at least one obstruction, and a property of the at least one obstruction. From the characteristics of the at least one obstruction, the GCSU 704 derives/determines the values of the second set of parameters using techniques as known in the art.

In one implementation, the value of the second set of parameters can be determined from pre-stored data corresponding to at least one obstruction available in one or more grids. The pre-stored data corresponding to the at least one obstruction includes: information related to geographic location of the one or more grids; information related to characteristics of at least one obstruction located in proximate to the geographic location; metadata associated with one or more optimum grids prior to current instance of time; and ranking associated with one or more optimum grids prior to current instance of time.

Accordingly, the LDU 707 determines location coordinates of the one or more grids and the DFU 709 fetches the obstruction data 711 from the storage unit 710 based on the location coordinates. Upon receiving the data, the GCSU 704 derives/determines the values of the second set of parameters using techniques as known in the art.

In one implementation, the value of the second set of parameters can be determined from current data corresponding to at least one obstruction available in one or more grids by capturing an image of the at least one obstruction. Accordingly, in one implementation, the device 700 is communicatively coupled with an image-capturing unit (ICU) 712 to capture an image or a video of the at least one obstruction. In another implementation, the ICU 712 is internal to the device 700. Upon capturing the image or video, the GCSU 704 analyses the captured image or video and derives/determines the values of the second set of parameters based on the analysis, using techniques as known in the art.

In one implementation, the value of the second set of parameters can be determined based on a user-input corresponding to at least one obstruction available in the one or more grids. In one example, the user-input can be a text data indicating the at least one obstruction at the one or more grids. In one example, the user-input can be an image of the at least one obstruction at the one or more grids. In one example, the user-input can be a touch-based user-input corresponding to at least one obstruction available in one or more grids. Examples of such touch-based input include, but not limited to, gesture input such as drag and drop. Upon receiving the user-input, the GCSU 704 obtains data corresponding to the obstructions in the one or more grids as described earlier. The GCSU 704 then determines/derives the value of the second set of parameters from the data as described earlier.

Upon determining the value of the second set of parameter, referring to FIG. 3, at least one grid having an optimum value of the second set of parameters is selected as the optimum grid at operation 302. The at least one grid is selected in the direction of the receiving antenna. To this end, the GCSU 704 fetches predefined threshold values 713 stored in the storage unit 710. Upon fetching, the GCSU 704 compares the determined value of the parameters with the predefined threshold value 713 and determines if the value is optimal with respect to the threshold value. In an implementation, the value is optimal if the value is lower than the predefined threshold value. In an implementation, the value is optimal if the value is higher than the predefined threshold value. Upon determining the value is optimal, the GCSU 704 selects the at least one grid with parameters having optimal value as the optimum grid. In an example, the GCSU 704 selects the optimum grid set with optimal value of one or more parameters as mentioned below, but not limited to: attenuation of signal passing through a grid is lower than a predefined threshold value; propagation delay of signal passing through a grid is lower than a predefined threshold value; latency of signal passing through a grid is lower than a predefined threshold value; single-to-noise-ratio at a grid is higher than a predefined threshold value; and quality of service for signal propagation through a grid is higher than a predefined threshold value; channel capacity is higher than a predefined threshold value; and signal-to-interference ratio is lower than a predefined threshold value.

In one implementation, the selection of the optimum grid(s) at operation 302 may include further operations as illustrated in FIG. 4. Referring to FIG. 4, at operation 401, a plurality of further sub-grids are created within at least one grid from among the one or more grids based on the value of the second set of parameters for the at least one grid. The further sub-grids divide a face of the grid into a by b matrix, wherein a value of "a" is equal to or more than one (1); and a value of "b" is equal to or more than one (1); and wherein "a"="b" 1. In one implementation, the further sub-grids within at least one grid can be created when the value of the second set of parameters of the at least one grid can be further optimized. In one implementation, the further sub-grids can be created based on a user-input. The user-input can be indicative of the number of grids to be formed or the size of the matrix. As discussed earlier, such user-input is received by the UIRU 708 via a user-interface provided by the GCSU 704. As such, the GCSU 704 creates further sub-grids in the grid in a manner as discussed earlier while creation of the one or more grids on the at least one selected face.

At operation 402, a value of the second set of parameters is determined for the further sub-grids. At operation 403, at least one further sub-grid having an optimum value of the second set of parameters is selected as the optimum grid set in the direction of a receiving antenna. As such, the GCSU 704 selects the optimum grid set from the further sub-grids in a manner as described earlier while selecting the optimum grid set from among the one or more grids.

In another implementation, the selection of the optimum grid(s) at operation 302 may include further operations as illustrated in FIG. 5.

Referring to FIG. 5, at operation 501 a visual representation is presented on a display unit. The visual representation includes (a) the transmitting antenna, (b) the virtual three-dimensional shape around the transmitting antenna, (c) the at least one selected face, (d) the one or more grids on the at least one selected face, and (e) the value of the second set of parameters for each of the one or more grids. To this end, the controller 702 includes a representation unit (RU) 714 to present the virtual representation on a display unit 715 communicatively coupled with the device 700. The RU 714 may obtain necessary details from the SCSU 703 and the GCSU 704 present the visual representation.

In addition, the RU 714 provides a preview user-interface including a plurality of obstructions available at the location of the transmitting antenna 701 to enable determination of second set of parameters for the grids, as described earlier. In an example, the RU 714 provides the preview user-interface as a preview edge on the display unit 715. Upon receiving the user-input, the GCSU 704 obtains data corresponding to the obstructions in the one or more grids as described earlier. The GCSU 704 then again determines/derives the value of the second set of parameters from the data as described earlier.

At operation 502, a user-input is received on the visual representation. The user-input is indicative of the selection of at least one grid on the visual representation as the optimum grid(s). At operation 503, the at least one grid as the optimum grid set based on the user-input. Accordingly, the UIRU 708 receives the user-input on the visual representation Thereafter, the GCSU 704 selects the at least one grids as the optimum grid(s).

Further, in one implementation, the SCSU 703 may continually track at least one obstruction based on the received data. In such case, the at least one obstruction is dynamic or movable such as, but not limited to, autonomous small size robots, unmanned aerial vehicle (UAV), vehicle, bird, human, and holding a mobile device. Further, in such case, the tracking of the at least one obstruction is performed to determine/predict a trajectory or path of the at least one movable obstruction. Based on such tracking, the GCSU 704 may continually determine the value of the second set of parameters at current instance time and/or forecast/predict the value of the second set of parameters for a later instance time. This enables both dynamic creation of the grids and selection of optimum grid set at current instance of time. In addition, such data including the at least one movable obstruction, the trajectory, determined values at the current instance of time, and the predicted values for the later instance of time are stored in the storage unit 710. As such, the GCSU 704 may obtain this stored data at the later instance time to update the trajectory, dynamically create the grids, and select optimum grid set at the later instance time. This results in elimination of creation of further grids and consequently beams jumping.

Figure 6:
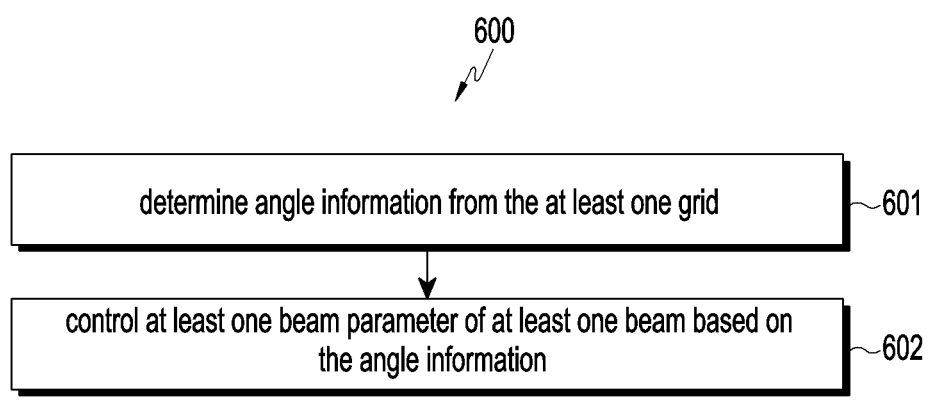
Figure 7:
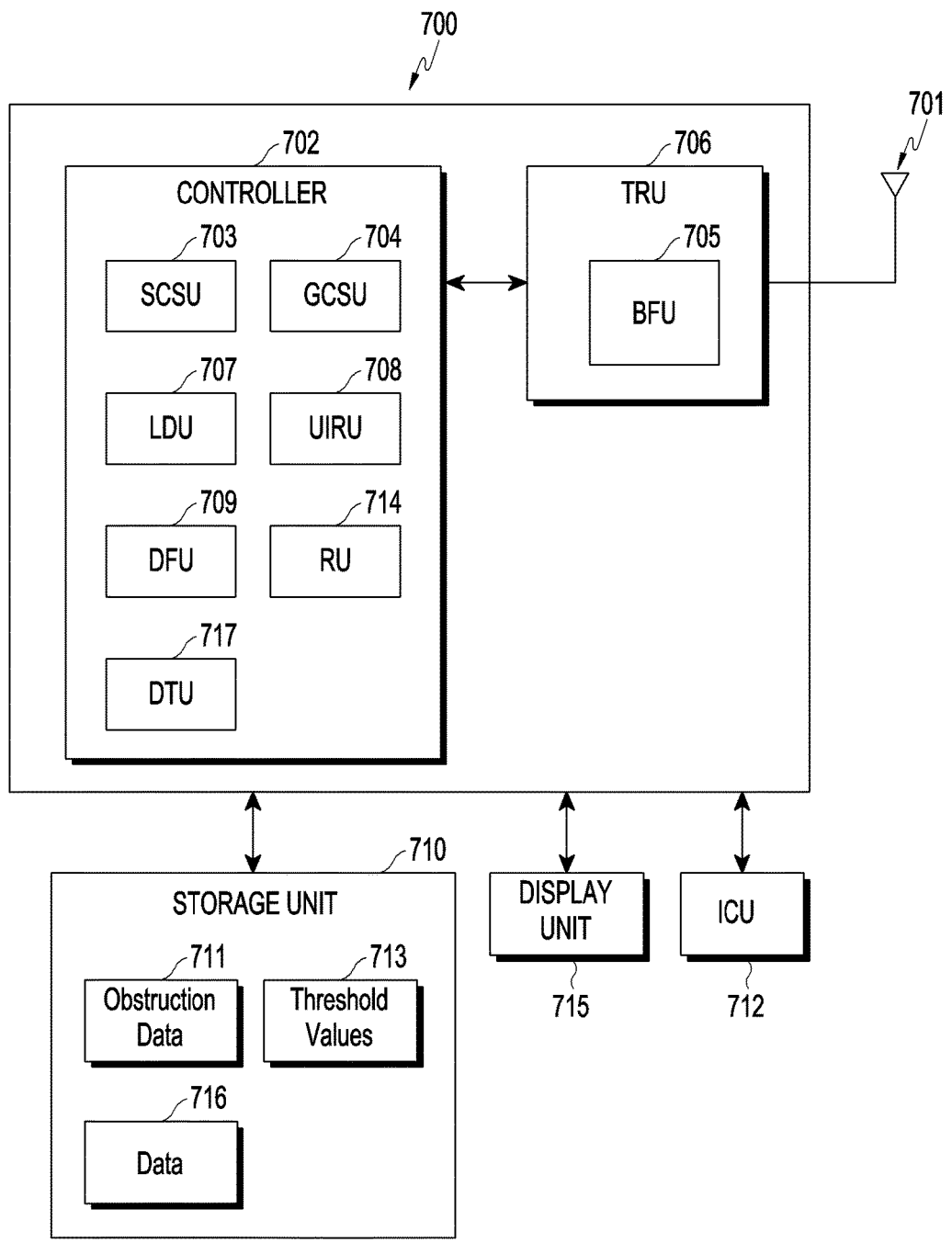
FIG. 7 illustrates device implementing the method for beam forming illustrated in FIGS. 1, 2, 3, 4, 5, and 6, according to the embodiment of the disclosure.

Further, referring to FIG. 1, the beam forming based on the selected optimum grid, as defined at operation 105, is performed by implementing operations of method 600 as described in FIG. 6, respectively. Thus, referring to FIG. 6 and FIG. 7, the device 700 implementing the beam forming method are described below.

At operation 601, angle information is determined from the at least one grid thus selected. As described earlier, the 3D beam forming combines elevation beam forming and azimuth beam forming. As such, the BFU 705 determines optimal electric down tilt for the selected optimum grid set and consequently determines optimal elevation angle and optimal azimuth angle based on the second set of parameters determined for the selected optimum grid.

At operation 602, at least one beam is formed by controlling at least one beam parameter of at least one beam based on the angle information thus determined. The at least one beam parameter includes weight gain, frequency, phase, amplitude, direction, width, intensity, power, signal to noise ratio, signal to interference plus noise ratio, interference, output energy, variance, correlation, elevation angle, and azimuth angle. In one implementation, at operation 602, one beam is formed corresponding to each of the selected optimum grids. In one implementation, at operation 602, multiple beams are formed corresponding to each of the selected optimum grids. In one implementation, at operation 602, the at least one beam is formed corresponding to a combination of plurality of selected optimum grids. As such, the BFU 705 forms the at least one beam by continually controlling elevation angle and azimuth angle in accordance with the angle information.

In an implementation, the BFU 705 may further continually control the other beam parameter(s) based on a set of predefined threshold values defined for the beam parameters and satisfy predetermined conditions. The predetermined conditions include at least one of: weight gain of the at least one beam is lower than a third predefined threshold value; weight gain of the at least one beam is higher than a predefined threshold value; weight gain of the at least one beam is equal to a predefined threshold value; variance of the at least one beam is lower than a predefined threshold value; output energy of the at least one beam is lower than a predefined threshold value; power of the at least one beam is lower than a first predefined threshold value; signal to noise ratio of the at least one beam is higher than a predefined threshold value; signal to interference plus noise ratio of the at least one beam is higher than a predefined threshold value; and interference of the at least one beam is lower than a predefined threshold value.

In one implementation, the predefined threshold values, as indicated above, can be stored in the storage unit 710 as the threshold values 713. It would be understood that the threshold value(s) might not be defined/set for all parameters. The threshold values may be added/updated/modified/after the beam formation for subsequent evaluation/scanning.

In one implementation, the BFU 705 may further control at least one beam parameter of at least one beam based on the data corresponding to at least one obstruction available in one or more grids. Such data can be obtained from the storage unit 710 or can be obtained from the GCSU 704 as described earlier. This results in elimination of beams jumping and creating too many beams.

In one implementation, the BFU 705 can also employ artificial intelligence to control the beam parameters. In another one implementation, the BFU 705 can also employ machine learning to control the beam parameters.

Upon forming the at least beam, the transmitting antenna 701 then transmits a signal through the at least one formed beam in the direction of the receiving antenna. Accordingly, the TRU 706 controls and performs a function of transmitting a signal to the receiving antenna through the at least one beam formed by the BFU 705. The transmitting antenna 701 then transmits the signal in the direction of the receiving antenna.

Further, upon forming the at least one beam and transmitting the signal, at least one function is performed with respect to data related to one or more of (a) the virtual three-dimensional shape, (b) the at least one selected face, (c) the at least one optimum grid, and (d) the at least one beam. The at least one function can include, but not limited to, such as storing, transmitting, metadata associating, tagging, ranking, and recommending.

Thus, in one implementation, data related to one or more of (a) the virtual three-dimensional shape, (b) the at least one selected face, (c) the at least one optimum grid, and (d) the at least one beam is stored in a storage unit. In such implementation, the controller 702 can store the data related to one or more of data related to one or more of (a) the virtual three-dimensional shape, (b) the at least one selected face, and (c) the at least one grid in the storage unit 710. Similarly, the BFU 705 can store data related to the at least one beam in the storage unit 710. Such data can be stored as data 716 in the storage unit 710.

In one implementation, metadata is associated with one or more of (a) the virtual three-dimensional shape, (b) the at least one selected face, (c) the at least one optimum grid, and (d) the at least one beam and the metadata is stored in the storage unit 710 as data 716. In such implementation, any one or all of the controller 702, the BFU 705, and the TRU 706 may generate metadata indicating beam experience as good, bad, better, worst, etc., and/or signal transmission result as successful, unsuccessful, etc. upon transmission of the signal by the transmitting antenna 701. The generated metadata may then be associated with the one or more of (a) the virtual three-dimensional shape, (b) the at least one selected face, (c) the at least one optimum grid, and (d) the at least one beam. The associated metadata is then stored in the storage unit 710. Such metadata can be used for performing the face selection and the grid selection later, as described above. In addition, to the beam experience and transmission result, the controller 702, the BFU 705, and the TRU 706 can determine corresponding geographical location, time-period, and other details, and store as metadata in the storage unit 710.

In one implementation, data related to one or more of (a) the virtual three-dimensional shape, (b) the at least one selected face, (c) the at least one optimum grid, and (d) the at least one beam is transmitted to a receiver. In such implementation, the controller 702 includes a data-transmitting unit (DTU) 717 to transmit the stored data 716 to a receiver (not shown in the figure) automatically upon or prior to or along with transmission of the signal by the transmitting antenna 701. Examples of such receiver include, but not limited to, user terminal such as smart phone, wearable devices, and a VR device, a base station, vehicle, UAVs, LEO satellites, autonomous small size robot such as drones, and IoT devices such as wireless modems, smart TV, etc. The DTU 717 may transmit the stored data 716 using techniques as known in the art.

In one implementation, a further user-input indicative of access control information is received. The access control information is then stored in the storage unit in a mapped relationship with data related to one or more of (a) the virtual three-dimensional shape, (b) the at least one selected face, (c) the at least one optimum grid, and (d) the at least one beam. In such implementation, the user-input is received via an input unit communicative coupled with the user terminal, the base station, the vehicle, and the autonomous small size robot of which the device 700 is the integral part, as described earlier. The UIRU 708 receives the user-input indicative of access control information. As would be understood, the access control information provides information of users and/or devices/apparatuses/systems that can access the stored data 716, thereby providing selective access to the storage unit 710. Upon receiving the access control information, the controller 702 stores the access control information in a mapped relationship with data related to virtual three-dimensional shape, selected face, optimum grid, beam, and metadata as the stored data in the storage unit 710. In a similar manner, the controller 702 may receive data from the receiver and store the received data in the storage unit 710 as the stored data 716.

In one implementation, a further user-input indicative of tagging one or more of (a) the virtual three-dimensional shape, (b) the at least one selected face, (c) the at least one optimum grid, and (d) the at least one beam is received. In such implementation, the controller 702 may present the aforesaid data on a display unit (not shown in the figure) in a manner as known in the art. Upon presenting the data, the UIRU 708 receives the user-input indicative of tagging the data. The tagging of data can be indicative of beam experience as good, bad, better, worst, etc., and/or signal transmission result as successful, unsuccessful, etc. Upon receiving the user-input, the controller 702 stores the data in a mapped relationship with above the data as the stored data in the storage unit 710.

In one implementation, a further user-input indicative of ranking one or more of (a) the virtual three-dimensional shape, (b) the at least one selected face, (c) the at least one optimum grid, and (d) the at least one beam is received. The ranking is then stored in the storage unit. In such implementation, the controller 702 may present the aforesaid data on the display unit, in a manner as known in the art. Upon presenting the data, the UIRU 708 receives the user-input indicative of ranking the data. The ranking can be based on at least one of beam experience, signal transmission result, geographical location, time-period, and other details. Upon receiving the user-input, the controller 702 stores the data in in a mapped relationship with the above mentioned data in the storage unit 710. In a similar manner, the controller 702 may receive ranking via the data sharing application and store the recommendation in the storage unit 710 as the stored data 716. In addition, the received data can be stored with respect to each user. In addition, the received data can be stored with respect to each user. This enables selection of required data based on users. For example, user A receives recommendation from user B and user C. Thus, when user A again tries to send data using the disclosure to user B, the data corresponding to user B will be preferred. Similarly, when user A again tries to send data using the disclosure to user C, the data corresponding to user C will be preferred. In addition, the reception of data related to other users enables performing a combined evaluation of data for selecting most suitable optimum grid.

In one implementation, a further user-input indicative of sharing data related to one or more of (a) the virtual three-dimensional shape, (b) the at least one selected face, (c) the at least one optimum grid, and (d) the at least one beam at least one data sharing application is received. In such implementation, the controller 702 may be linked/ connected with a data sharing application via mechanism knows in the art. Examples of such data sharing application include, but not limited to, a chat application, an instant messaging application, a messaging application, and social media application. Examples of such mechanisms include, but not limited to, extensions, plug-ins, and inbuilt mechanisms. Accordingly, the UIRU 708 receives the user-input indicative of sharing the data sharing application. Upon receiving the user-input, the controller 702 enables the user to select and share data in a manner as known in the art. In a similar manner, the controller 702 may receive data via the data application and store the received data in the storage unit 710 as the stored data 716. In addition, the reception of data related to other users enables performing a combined evaluation of data for selecting most suitable optimum grid.

In one implementation, a further user-input indicative of recommending data related to one or more of (a) the virtual three-dimensional shape, (b) the at least one selected face, (c) the at least one optimum grid, and (d) the at least one beam via the at least one data sharing application is received. In such implementation, the UIRU 708 receives the user-input indicative of sharing the data sharing application, as described above. Upon receiving the user-input, the controller 702 enables the user to select and recommend data in a manner as known in the art. The recommendation can be based on at least one of beam experience, signal transmission result, geographical location, time-period, and other details. In a similar manner, the controller 702 may receive recommendation via the data sharing application and store the recommendation in the storage unit 710 as the stored data 716. In addition, the received data can be stored with respect to each user. This enables selection of required data based on users. For example, user A receives recommendation from user B and user C. Thus, when user A again tries to send data using the disclosure to user B, the data corresponding to user B will be preferred. Similarly, when user A again tries to send data using the disclosure to user C, the data corresponding to user C will be preferred. In addition, the reception of data related to other users enables performing a combined evaluation of data for selecting most suitable optimum grid.

Although, the above description explains the method of beam forming in accordance with the disclosure for the transmitting antenna, it is to be understood that same method can be implemented for the receiving antenna. As such, the receiving antenna may also be coupled with a device (not shown in the figure) having units as explained above.

Thus, the disclosure enables forming an efficient and high direction beam based on at the least one grid with minimal losses. This reduces time required to search for a beam path with minimal propagation loss.

As such, the disclosure can be implemented for various communication systems for transmitting and receiving signals with minimal losses and minimal delay. Examples of communication systems include, but not limited to, multiple input multiple output (MIMO) communication systems, multiple input single output (MISO) communication systems, single input multiple output (SIMO) communication systems, etc.

Similarly, the disclosure can be implemented within devices/systems/apparatus operating in various wireless/cel- lular networks for transmitting and receiving data with minimal losses and minimal delay. Examples of network include, but not limited to, indoor wireless networks, outdoor wireless networks, core network interfaces, back end networks, cloud based networks such as device-to-device (D2D) network and machine-to-machine (M2M) network, etc.

Figure 8:
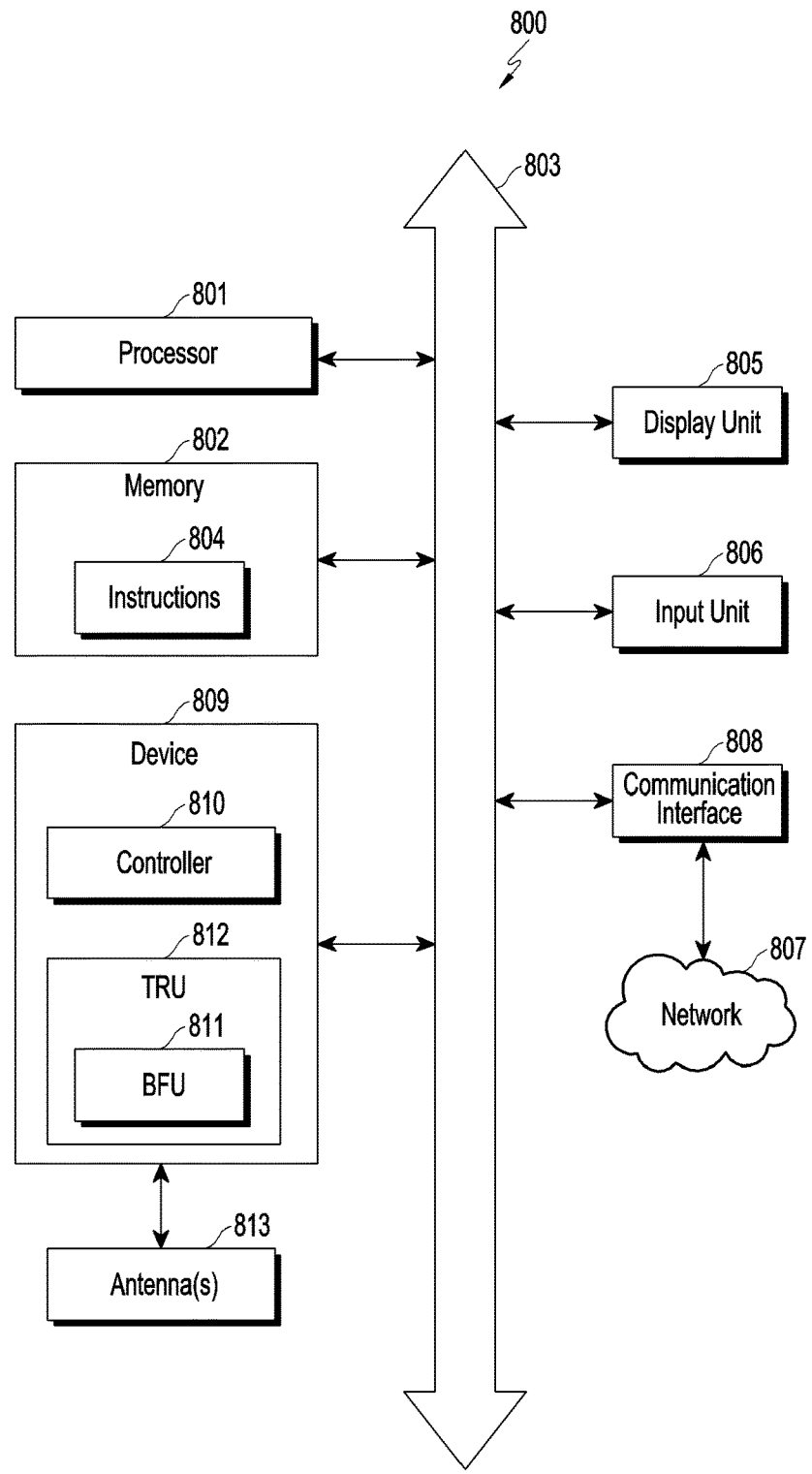
FIG. 8 is a block diagram illustrating an example of architecture of a system configured for use in wireless communication, according to the embodiment of the disclosure.

FIG. 8 is a block diagram illustrating an example of architecture of a system 800 configured for use in wireless communication, according to an embodiment of the disclosure.

Referring to FIG. 8, the system 800 can be part of MIMO communication systems, MISO communication systems, SIMO communication systems, etc., that can send or receive signals in either of indoor environments and outdoor environments. Thus, in one implementation, the system 800 can be user terminal such as smart phone, wearable devices, and a VR device, UAVs, LEO satellites, autonomous small size robot such as drones, and IoT devices such as wireless modems, smart TV, etc. In another implementation, the system 800 can also be part of a vehicle.

The system 800 may include a processor 801, e.g., a central processing unit (CPU), a graphics processing unit (GPU), or both. The processor 801 may be a component in a variety of systems. For example, the processor 801 may be part of a standard personal computer or a workstation. The processor 801 may be one or more general processors, digital signal processors, application specific integrated circuits, field programmable gate arrays, servers, networks, digital circuits, analog circuits, combinations thereof, or other now known or later developed devices for analyzing and processing data The processor 801 may implement a software program, such as code generated manually (i.e., programmed). The processor 801 may include at least one central processing unit (CPU). The processor 801 may be operated as a controller.

The system 800 may include a memory 802, such as a memory 802 that can communicate via a bus 803. The memory 802 may be a main memory, a static memory, or a dynamic memory. The memory 802 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 802 includes a cache or random access memory for the processor 801. In alternative examples, the memory 802 is separate from the processor 801, such as a cache memory of a processor, the system memory, or other memory. The memory 802 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 802 is operable to store instructions 804 executable by the processor 801. The functions, acts or tasks illustrated in the figures or described may be performed by the programmed processor 801 executing the instructions stored in the memory 802. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The system 800 may further include a display unit 805, such as a liquid crystal display (LCD), an organic light emitting diode (OLED), a flat panel display, a solid state display, a cathode ray tube (CRT), a projector, a printer or other now known or later developed display device for outputting determined information. The display unit 805 may act as an interface for the user to see the functioning of the processor 801, or other units. The system 800 may further include other output devices (not shown in the figure).

The system 800 may further include an input unit 806 configured to allow a user to interact with any of the components of system 800. The input device may be a number pad, a keyboard, or a cursor control device, such as a mouse, or a joystick, touch screen display, remote control or any other device operative to interact with the system 800.

The system 800 may be connected to a network 807 to communicate voice, video, audio, images or any other data over the network 807. Further, the instructions 804 may be transmitted or received over the network 807 via a communication interface 808 or network 807 or using the bus 803. The communication interface 808 or network 807 may be a part of the processor 801 or may be a separate component. The communication interface 808 may be created in software or may be a physical connection in hardware. The communication interface 808 may be configured to connect with the network 807, external media, the display unit 805, or any other components in system 800, or combinations thereof. The connection with the network 807 may be a physical connection, such as a wired Ethernet connection or may be established wirelessly as discussed later. Likewise, the additional connections with other components of the system 800 may be physical connections or may be established wirelessly. The network 807 may alternatively be directly connected to the bus 803. The communication interface 808 may be a transceiver.

The network 807 may include wired networks, wireless networks, Ethernet AVB networks, or combinations thereof. The wireless network may be a cellular telephone network, an 802.11, 802.16, 802.70, 802.1Q or Wi Max network. Further, the network 807 may be a public network, such as the Internet, a private network, such as an intranet, or combinations thereof, and may utilize a variety of networking protocols now available or later developed including, but not limited to TCP/IP based networking protocols.

The system 800 may further include a device 809 for forming a beam in accordance with the disclosure. The device 809 can include a controller 810 to select at least one obstruction free zone and at one obstruction free beam window, as described in various embodiments above. The device 809 further includes forming unit (BFU) 811 within a TRU 812. The BFU 811 forms at least one beam based on the optimum grids selected by the controller 810, as described in various embodiments above. The TRU 812 transmits or receives a signal to/from a receiver through the at least one beam formed by the BFU 811 via one or more antennas 813. In one implementation, the antenna(s) 813 transmit or receive the signal over millimeter waves (mmWV). Examples of the antenna(s) 813 can include, but not limited to, a beam antenna and an array antenna that can form one or more beams in a specific direction.

Further, in one implementation, the device 809 can be a separate component. In one implementation, the device 809 can be part of a dedicated radio frequency (RF) unit (not shown in the figure) connected to the antenna(s) 813. In one implementation, the device 809 can be a software component implemented in a physical layer of a digital RF interface, as per current communications standards.

Further, the receiver can be part of MIMO communication systems, MISO communication systems, SIMO communication systems, etc., that can send or receive signals in either of indoor environments and outdoor environments. For example, the receiver can be a base station, a user-terminal, a vehicle, an IOT device, and an autonomous small size robot.

Although, specific components have been illustrated in the figure, the system 800 may include further components (hardware/software/combination thereof) necessary for proper functioning/operation of the system 800 as required.

Figure 9:
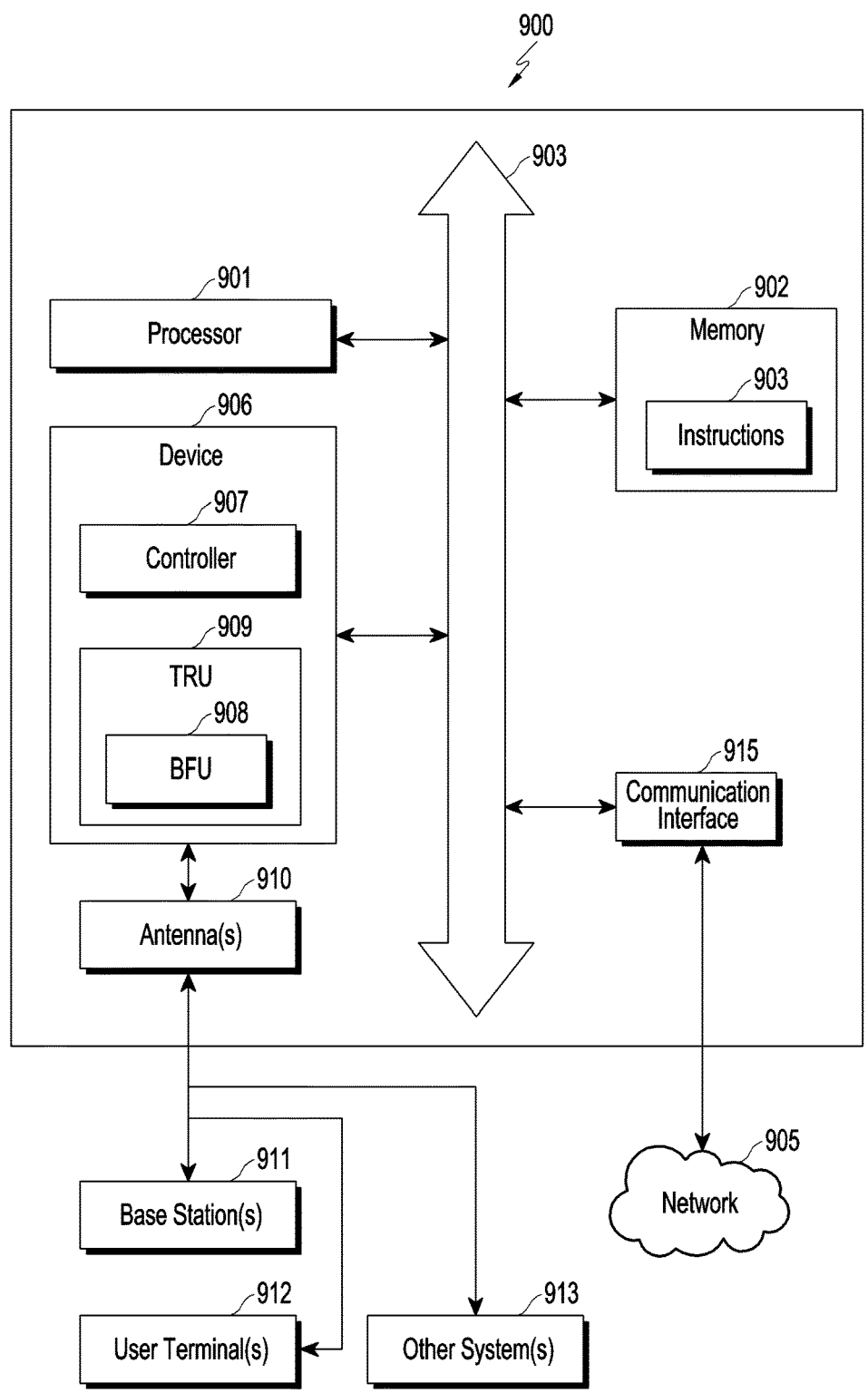
FIG. 9 is a block diagram illustrating an example of architecture of a base station configured for use in wireless communication, according to the embodiment of the disclosure.

FIG. 9 is a block diagram illustrating an example of architecture of a system 900 configured for use in wireless communication, according to an embodiment of the disclosure. The system 900 can be base station.

Referring to FIG. 9, the system 900 may include a processor 901, e.g., a CPU, a GPU, or both. The processor 901 may be a component in a variety of systems. For example, the processor 901 may be part of a standard personal computer or a workstation. The processor 901 may be one or more general processors, digital signal processors, application specific integrated circuits, field programmable gate arrays, servers, networks, digital circuits, analog circuits, combinations thereof, or other now known or later developed devices for analyzing and processing data The processor 901 may implement a software program, such as code generated manually (i.e., programmed). The processor 901 may include at least one central processing unit (CPU). The processor 901 may be operated as a controller.

The system 900 may include a memory 902, such as a memory 902 that can communicate via a bus 903. The memory 902 may be a main memory, a static memory, or a dynamic memory. The memory 902 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 902 includes a cache or random access memory for the processor 901. In alternative examples, the memory 902 is separate from the processor 901, such as a cache memory of a processor, the system memory, or other memory. The memory 902 may be an external storage device or database for storing data. Examples include a hard drive, "CD", "DVD", memory card, memory stick, floppy disc, "USB" memory device, or any other device operative to store data. The memory 902 is operable to store instructions 904 executable by the processor 901. The functions, acts or tasks illustrated in the figures or described may be performed by the programmed processor 901 executing the instructions stored in the memory 902. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The system 900 may be connected to a network 905 to communicate voice, video, audio, images or any other data over the network 905. Further, the instructions 904 may be transmitted or received over the network 905 via a communication interface 915 or network 905 or using the bus 903. The communication interface 915 or network 905 may be a part of the processor 901 or may be a separate component. The communication interface 915 may be created in software or may be a physical connection in hardware. The communication interface 915 may be configured to connect with the network 905, external media, a display unit (not shown in the figure), or any other components in system 900, or combinations thereof. The connection with the network 905 may be a physical connection, such as a wired Ethernet connection or may be established wirelessly as discussed later. Likewise, the additional connections with other components of the system 900 may be physical connections or may be established wirelessly. The network 905 may alternatively be directly connected to the bus 903. The communication interface 915 may be a transceiver.

The network 905 may include wired networks, wireless networks, Ethernet AVB networks, or combinations thereof. The wireless network may be a cellular telephone network, an 802.11, 802.16, 802.70, 802.1Q or Wi Max network. Further, the network 905 may be a public network, such as the Internet, a private network, such as an intranet, or combinations thereof, and may utilize a variety of networking protocols now available or later developed including, but not limited to TCP/IP based networking protocols.

The system 900 may further include a device 906 for forming a beam in accordance with the disclosure. The device 906 can include a controller 907 to select at least one obstruction free zone and at one obstruction free beam window, as described in various embodiments above. The device 906 further includes BFU 908 within a TRU 909. The BFU 908 forms at least one beam based on the optimum grids selected by the controller 907, as described in various embodiments above. The TRU 909 transmits or receives a signal to/from a receiver through the at least one beam formed by the BFU 908 via one or more antennas 910. In one implementation, the antenna(s) 910 transmit or receive the signal over mmWV. Examples of the antenna(s) 910 can include, but not limited to, a beam antenna and an array antenna that can form a beam in a specific direction. The receiver can be base station(s) 911, user terminal(s) 912 such as smart phone whose architecture was illustrated in FIG. 8, and other system(s) 913 such as an IOT device, vehicle, and an autonomous small size robot.

FIGS. 10A to 10H illustrates an example 1000 of implementing the method of beam forming as described above by a base station 1001 according to an embodiment of the disclosure.

Figure 10A:
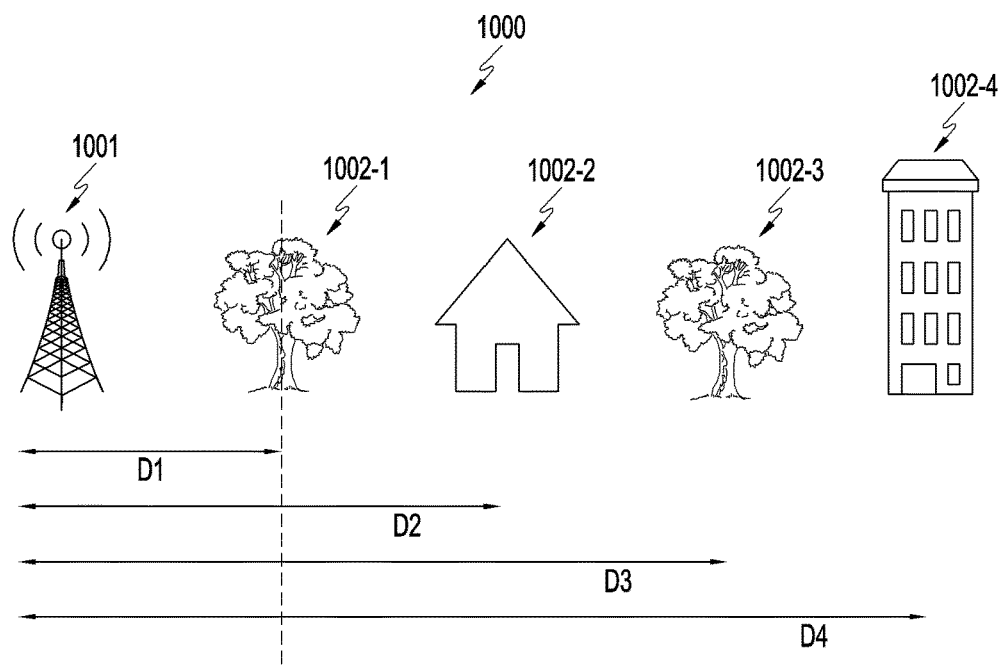
FIGS. 10A, 10B, 10C, 10D, 10E, 10F, 10G, and 10H illustrate an example of implementing the method for beam forming in a base station, in accordance with the disclosure.

Referring to FIG. 10A, to create the virtual three-dimensional shape, data related to a plurality of obstructions 1002 at current location of base station 1001 is obtained. For the sake of brevity, only a side view is illustrated for illustrating distance between the base station 1001 and a plurality of obstructions. The base station 1001 may include one or more transmitting antennas. As illustrated, a first obstruction 1002-1 such as tree is determined to be at distance D1 from the base station 1001 based on the received data. Similarly, a second obstruction 1002-2 such as house is determined to be at distance D2 from the base station 1001 and a third obstruction 1002-3 such as tree is determined to be at distance D3 from the base station 1001 based on the received data. Likewise, a fourth obstruction 1002-4 such as building is determined to be at distance D4 from the base station 1001. As can be gathered, the first obstruction 1002-1 is nearest to the base station 1001 and the distance D1 is the minimum distance from among the distances between the obstructions. In a similar manner, the minimum distance is calculated from all sides/directions of the base station 1001. As such, the virtual three-dimensional shape is created such that the base station 1001 is at the center of the virtual three-dimensional shape and a radius/distance from the center of virtual three-dimensional shape to a face of the three-dimensional shape is D1, the minimum distance (represented by dashed line).

Figure 10B:
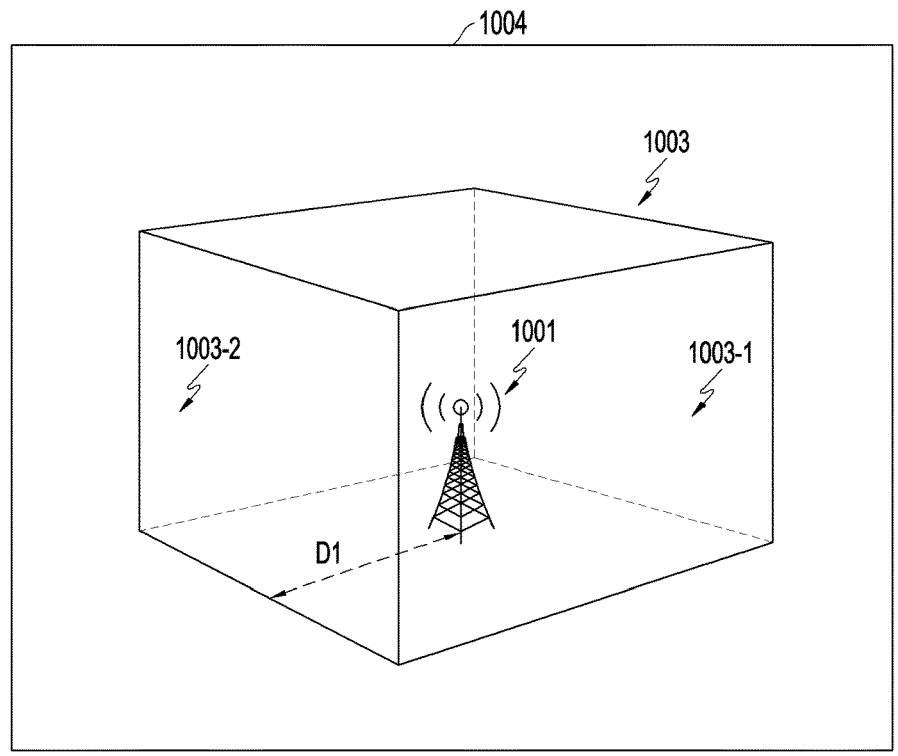

Referring to FIG. 10B, illustrates an example virtual three-dimensional shape 1003 in form of cube created around the transmitting antenna with minimum distance D1. The virtual three-dimensional shape 1003 is also depicted on a display unit 1004. In the example, a receiving antenna may be located in the direction of the side faces 1003-1 and 1003-2. Therefore, side faces 1003-1 and 1003-2 are selected based on the first set of parameters as described above.

Figure 10C:
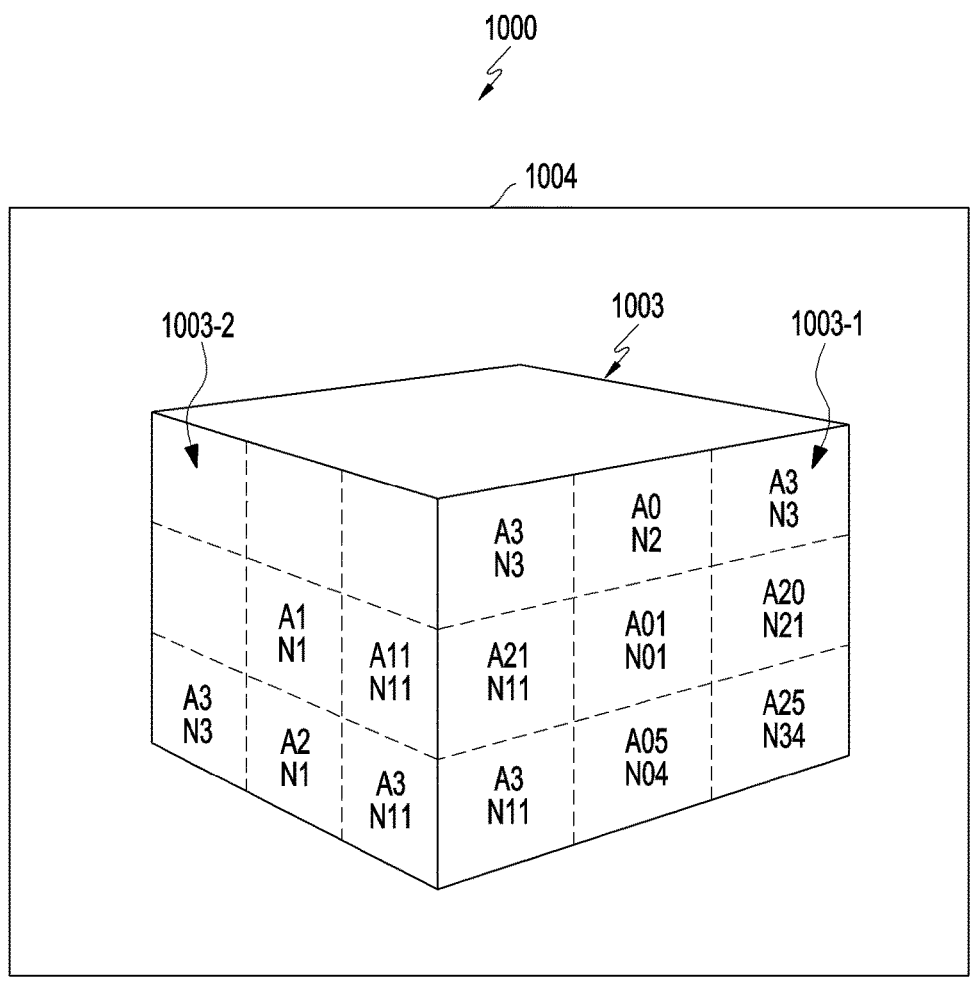

Referring to FIG. 10C, a plurality of grids 1005 (represented by squares formed by dashed line) are formed on the side faces 1003-1 and 1003-2, in a manner as described above. The plurality of grids 1005 are formed by dividing the faces into 3-×-3 matrix, in a manner as described earlier. For each of the grid, a value of the second set of parameters is determined. For the sake of brevity, only two parameters attenuation as A and network efficiency as N are depicted, and the base stations has not been depicted. Further, reference numerals 0, 1, 2, and 3 indicate a value of the parameter which three (3) being higher value and zero (0) being lower value.

Figure 10D:
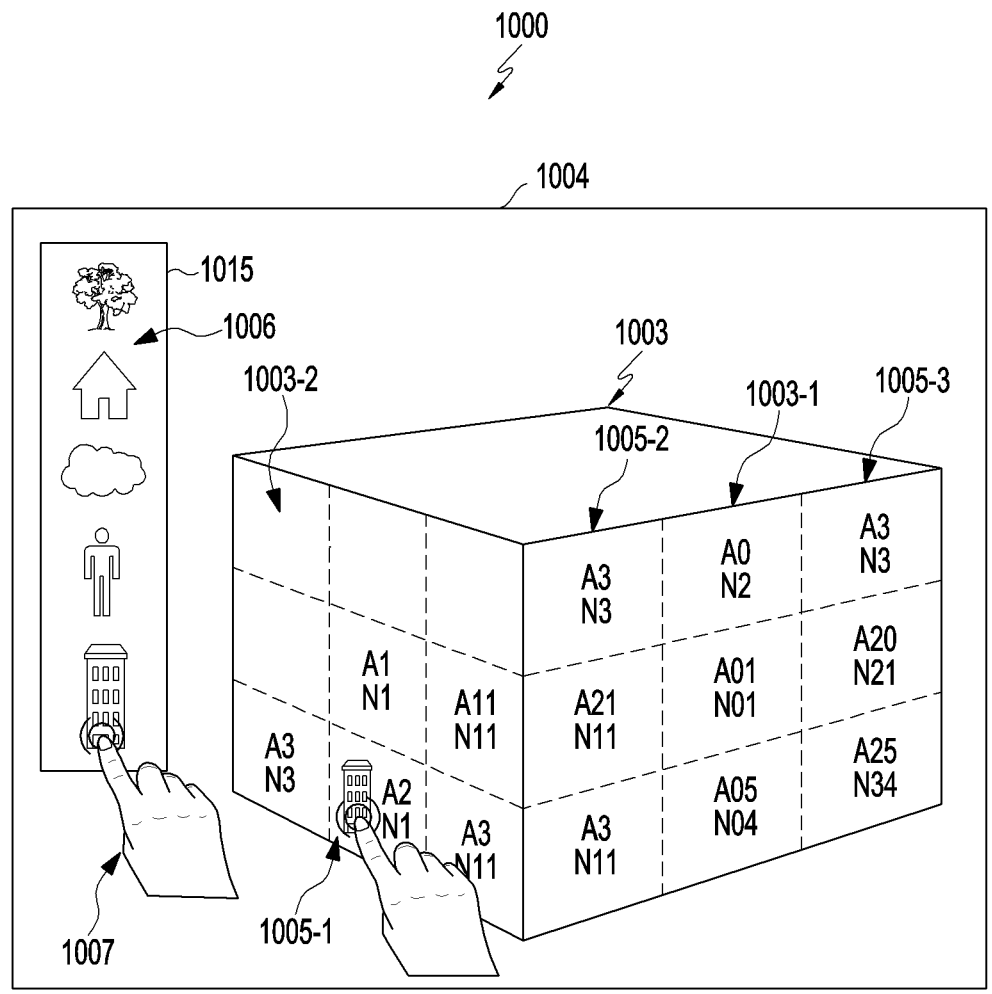

Referring to FIG. 10D, a preview user-interface 1015 is provided on the display unit 1004. The user-interface 1015 displays a plurality of icons 1006 indicative of obstructions as available near the base station 1001. A user-input 1007 can be received to indicate presence of an obstruction in a grid 1005-1.

Figure 10E:
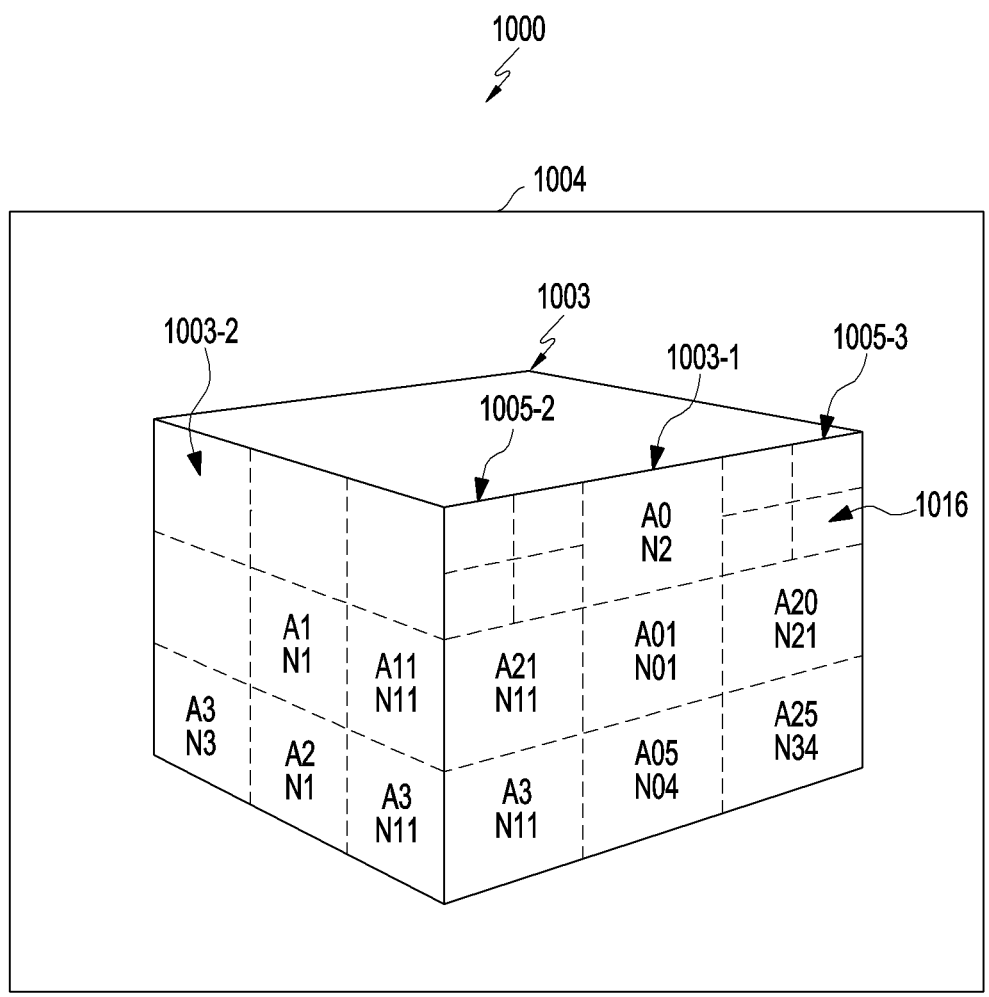

Referring to FIG. 10E, based on the user-input, the data corresponding to the obstruction is fetched and the value of attenuation and network efficiency is re-determined for the grid 1005-1 from A2N1 to A22N12. Based on the values of attenuation and network efficiency, A3N3, the further sub-grids of 2×2 matrix are created in grids of face 1003-1.

Figure 10F:
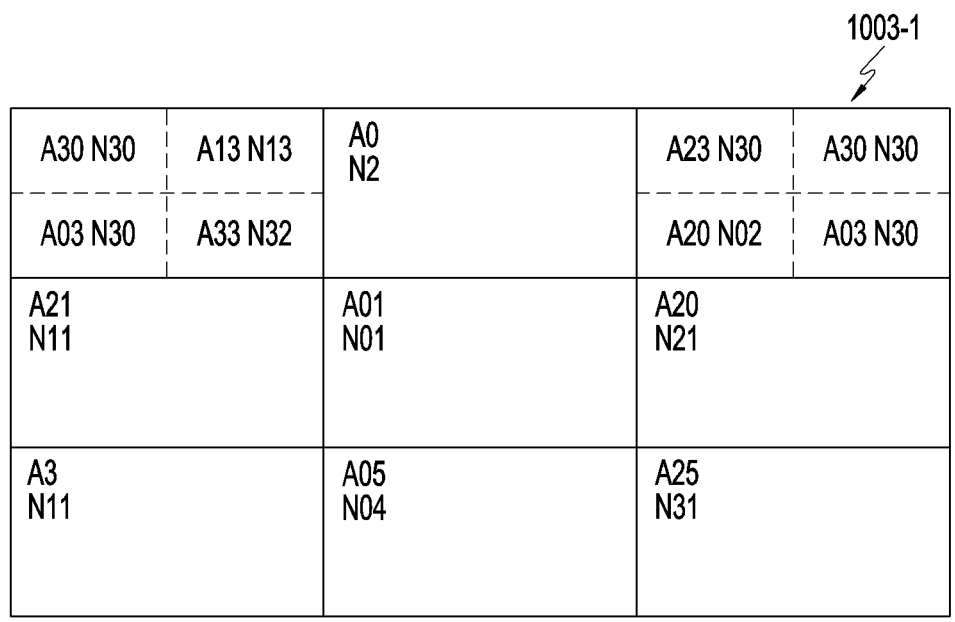

Referring to FIG. 10F illustrates a front view of the face 1003-1 depicting the grids 1005-2 and 1005-3, and sub-grids 1016 (represented by squares formed by dashed lines) within the grids 1005-2 and 1005-3 along with values of attenuation A and network efficiency N.

Figure 10G:
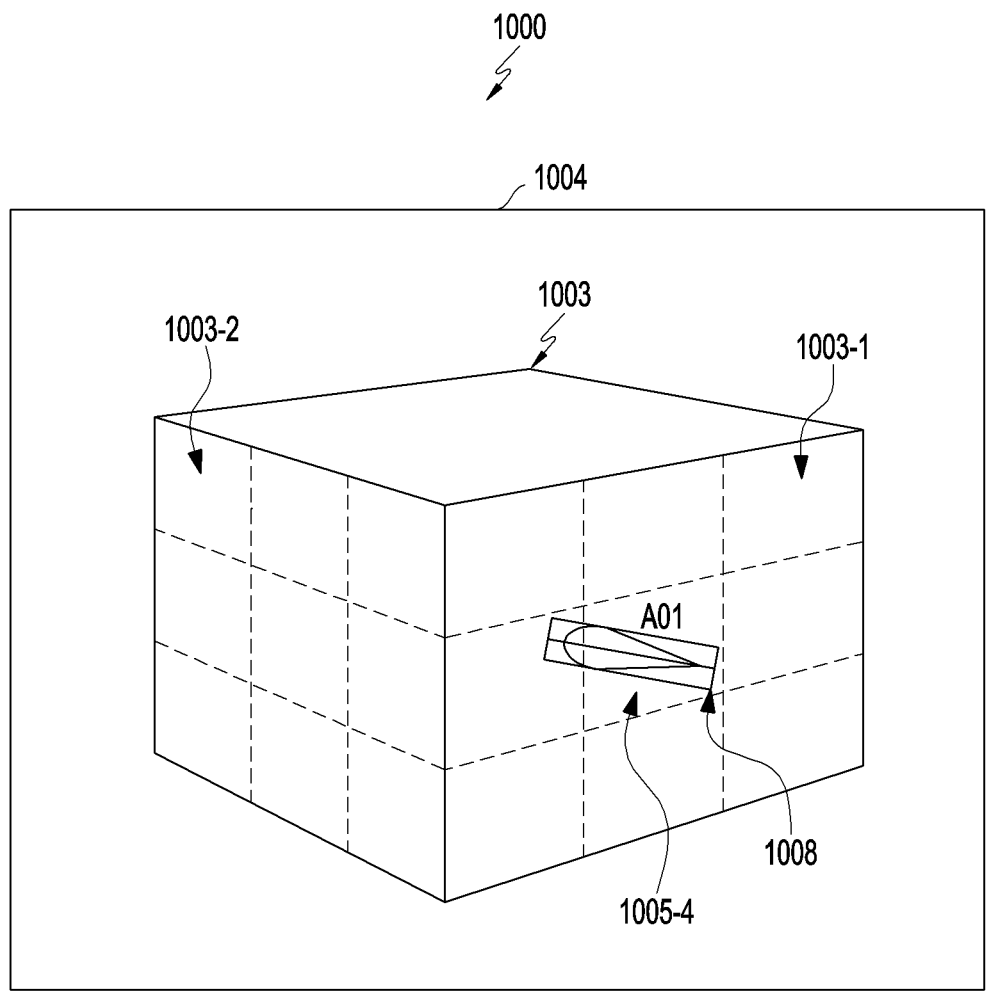

Referring to FIG. 10G, grid 1003-1 with attenuation A01 and network efficiency N01 as optimal values, is selected as the optimum grid, and a beam 1010 is formed by determining angle information.

Figure 10H:
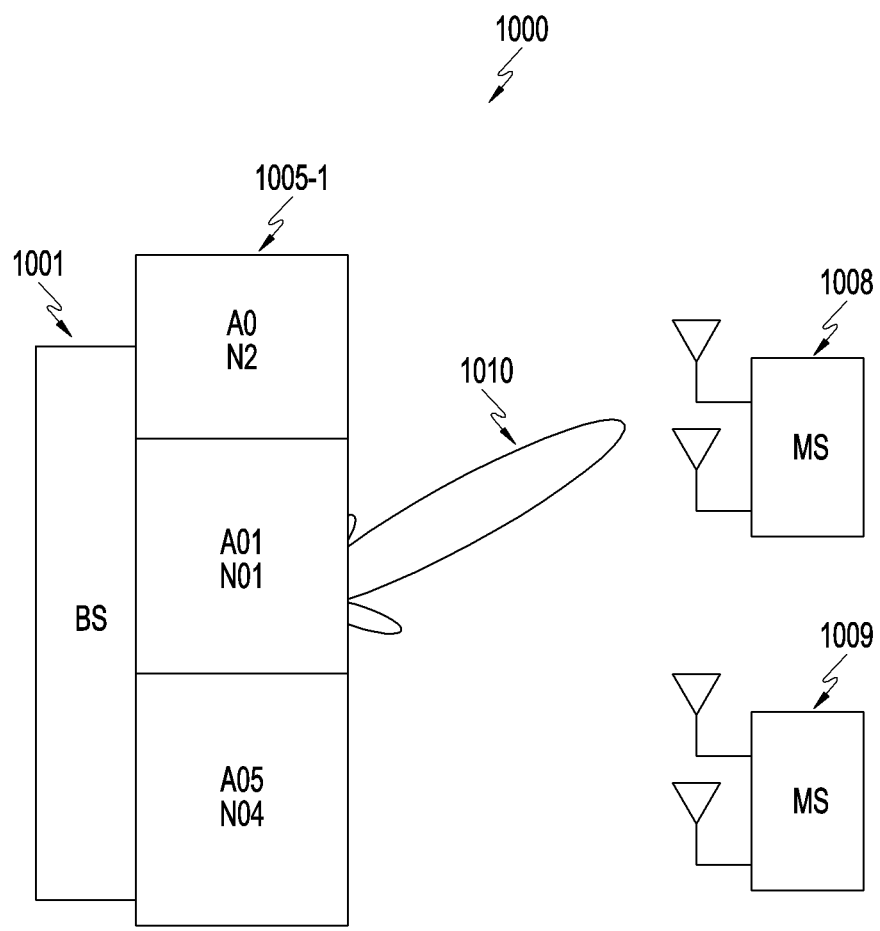

Referring to FIG. 10H, the base station 1001 transmits signal via the beam 1010 formed in accordance with grid 1005-4 towards the receiving antenna of a target mobile device 1008. This enables creating highly-directional beam towards the target mobile device 1008 such that a coverage area of the beam only includes target mobile device 1008 and not any interfering mobile device 1009.

According to various embodiments, a beam forming method for a transmitting antenna may comprise: creating a virtual three-dimensional shape around the transmitting antenna; selecting at least one face from among a plurality of faces of the virtual three-dimensional shape based on a first parameter set; creating one or more grids on the at least one face; selecting at least one grid from among the one or more grids based on a second parameter set; and forming at least one beam based on the at least one grid.

According to various embodiments, the beam forming method may further comprise: obtaining a current location of the transmitting antenna; receiving obstruction data related to at least one obstruction based on the current location; selecting the virtual three-dimensional shape from among a plurality of virtual three-dimensional shapes based on the obstruction data, wherein the transmitting antenna is at a center of the virtual three-dimensional shape; and creating the virtual three-dimensional shape around the transmitting antenna. Additionally, a distance from the center of the virtual three-dimensional shape to a face of the three-dimensional shape may be a minimum distance between the transmitting antenna and the at least one obstruction.

Additionally, the obstruction data may be received from at least one of a storage unit, at least one reflected signal that is received from the current location, or a user input. The first parameter set may include at least one of channel sense information, first data related to the transmitting antenna, second data related to a receiving antenna, a direction of the receiving antenna, cellular information, or a user input. The second parameter set includes at least one of an attenuation, a propagation delay, a network efficiency, a quality of service (QoS), a latency, a signal-to-noise ratio (SNR) channel capacity, or a signal-to-interference ratio. The one or more grids may divide a face of the virtual three-dimensional shape into an N×M matrix.

According to various embodiments, the beam forming method may further comprise: obtaining a value of the second parameter set for each of the one or more grids; and selecting the at least one grid from the one or more grids, based on the value of the second parameter set, the at least one grid being in a direction of a receiving antenna.

According to various embodiments, the beam forming method may further comprise: receiving at least one reflected signal, the at least one reflected signal being received from the one or more grids; receiving data corresponding to at least one obstruction available in the one or more grids from a storage unit; receiving image data corresponding to the at least one obstruction available in the one or more grids from an image capturing unit; or receiving a user input corresponding to the at least one obstruction available in the one or more grids.

Additionally, the image data includes at least one of: information related to a geographic location of the one or more grids; information related to characteristics of the at least one obstruction located in proximity to the geographic location; metadata associated with the at least one grid prior to current instance of time; or a rank associated with the at least one grid prior to the current instance of time.

According to various embodiments, the beam forming method may further comprise: creating sub-grids within the at least one grid based on the value of the second parameter set for the at least one grid; obtaining a value of the second parameter set for the sub-grids; selecting at least one sub-grid from the sub-grids based on the value of the second parameter set for the sub-grids, the at least one sub-grid being in a direction of a receiving antenna.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transmitting a beam by a base station, the method comprising:

creating a virtual three-dimensional shape around the transmitting antenna;

selecting at least one face from among a plurality of faces of the virtual three-dimensional shape based on a first parameter set;

creating one or more grids on the at least one face;

selecting at least one grid from among the one or more grids based on a second parameter set; and transmitting at least one beam based on the at least one grid.

2. The method of claim 1, wherein the creating of the virtual three-dimensional shape comprises:

obtaining a current location of the transmitting antenna;

receiving obstruction data related to at least one obstruction based on the current location;

selecting the virtual three-dimensional shape from among a plurality of virtual three-dimensional shapes based on the obstruction data, wherein the transmitting antenna is at a center of the virtual three-dimensional shape; and creating the virtual three-dimensional shape around the transmitting antenna;

wherein a distance from the center of the virtual three-dimensional shape to a face of the virtual three-dimensional shape is a minimum distance between the transmitting antenna and the at least one obstruction.

3. The method of claim 2, wherein the obstruction data is received from at least one of a storage unit, at least one reflected signal that is received from the current location, or a user input.

4. The method of claim 1, wherein the first parameter set includes at least one of channel sense information, first data related to the transmitting antenna, second data related to a receiving antenna, a direction of the receiving antenna, cellular information, or a user input, and wherein the second parameter set includes at least one of an attenuation, a propagation delay, a network efficiency, a quality of service (QoS), a latency, a signal-to-noise ratio (SNR) channel capacity, or a signal-to-interference ratio.

5. The method of claim 1, wherein a face of the virtual three-dimensional shape is divided into an N×M matrix by the one or more grids, and wherein a value of N is equal to or more than 1 and a value of M is equal to or more than 1.

6. The method of claim 1, wherein the selecting of the at least one grid comprises:

obtaining a value of the second parameter set for each of the one or more grids; and selecting the at least one grid from the one or more grids, based on the value of the second parameter set, the at least one grid being in a direction of a receiving antenna.

7. The method of claim 6, wherein the obtaining of the value of the second parameter set comprises at least one of:

receiving at least one reflected signal, the at least one reflected signal being received from the one or more grids;

receiving data corresponding to at least one obstruction available in the one or more grids;

receiving image data corresponding to the at least one obstruction available in the one or more grids; or receiving a user input corresponding to the at least one obstruction available in the one or more grids.

8. The method of claim 7, wherein the image data includes at least one of:

information related to a geographic location of the one or more grids;
information related to characteristics of the at least one obstruction located in proximity to the geographic location;
metadata associated with the at least one grid prior to current instance of time; or
a rank associated with the at least one grid prior to the current instance of time.

9. The method of claim 6, further comprising:
creating sub-grids within the at least one grid based on the value of the second parameter set for the at least one grid;
obtaining a value of the second parameter set for the sub-grids;
selecting at least one sub-grid from the sub-grids based on the value of the second parameter set for the sub-grids, the at least one sub-grid being in a direction of the receiving antenna.

10. The method of claim 6, wherein selecting the at least one grid comprises:
displaying a visual representation including the transmitting antenna, the virtual three-dimensional shape around the transmitting antenna, the at least one face, the one or more grids on the at least one face, and the value of the second parameter set for each of the one or more grids;
receiving a user input on the visual representation; and
selecting the at least one grid based on the user input.

11. The method of claim 1, further comprising:
determining angle information from the at least one grid; and
controlling at least one beam parameter of the at least one beam based on the angle information.

12. The method of claim 11, wherein the at least one beam parameter includes at least one of a gain, a frequency, a phase, an amplitude, a direction, a width, an intensity, a power, a signal to noise ratio, a signal to interference plus noise ratio, an interference, an output energy, a variance, a correlation, an elevation angle, or azimuth angle.

13. The method of claim 11, wherein the controlling of the at least one beam parameter is further based on obstruction data related to at least one obstruction based on a current location.

14. A device for transmitting a beam, the device comprising:
a transceiver;
a memory; and
at least one processor coupled to the transceiver and the memory,
wherein the at least one processor is configured to:
create a virtual three-dimensional shape around the transmitting antenna,
select at least one face from among a plurality of faces of the virtual three-dimensional shape based on a first parameter set,
create one or more grids on the at least one face,
select at least one grid from among the one or more grids based on a second parameter set, and
control the transceiver to transmit at least one beam based on the at least one grid.

15. The device of claim 14,
wherein the at least one processor is further configured to obtain a current location of the transmitting antenna.

16. The device of claim 15,
wherein when the at least one processor creates the virtual three-dimensional shape, the at least one processor is further configured to:
receive obstruction data related to at least one obstruction based on the current location,
select the virtual three-dimensional shape from among a plurality of virtual three-dimensional shapes based on the obstruction data, wherein the transmitting antenna is at a center of the virtual three-dimensional shape; and
create the virtual three-dimensional shape around the transmitting antenna,
wherein a distance from the center of the virtual three-dimensional shape to a face of the virtual three-dimensional shape is a minimum distance between the transmitting antenna and the at least one obstruction.

17. The device of claim 14,
wherein the first parameter set includes at least one of channel sense information, first data related to the transmitting antenna, second data related to a receiving antenna, a direction of the receiving antenna, cellular information, or a user input, and
wherein the second parameter set includes at least one of an attenuation, a propagation delay, a network efficiency, a quality of service (QoS), a latency, a signal-to-noise ratio (SNR) channel capacity, or a signal-to-interference ratio.

18. The device of claim 14,
wherein a face of the virtual three-dimensional shape is divided into an N×M matrix by the one or more grids, and
wherein a value of N is equal to or more than 1 and a value of M is equal to or more than 1.

19. The device of claim 14, wherein, when the at least one processor selects the at least one grid, the at least one processor is further configured to:
obtain a value of the second parameter set for each of the one or more grids, and
select the at least one grid from the one or more grids, based on the value of the second parameter set, the at least one grid being in a direction of a receiving antenna.

20. The device of claim 19, wherein, when the at least one processor selects the at least one grid, the at least one processor is further configured to:
create sub-grids within the at least one grid based on the value of the second parameter set,
obtain a value of the second parameter set for the sub-grids,
select at least one sub-grid from the sub-grids, based on the value of the second set for the sub-grids, the at least one sub-grid being in a direction of the receiving antenna.

21. The device of claim 19, wherein, when the at least one processor selects the at least one grid, the at least one processor is further configured to:
display a visual representation including the transmitting antenna, the virtual three-dimensional shape around the transmitting antenna, the at least one face, the one or more grids on the at least one selected face, and the value of the second parameter set for each of the one or more grids,
receive a user input on the visual representation, and
select the at least one grid based on the user input.

22. The device of claim 14, wherein the at least one processor is further configured to:
- determine angle information from the at least one grid; and
- control at least one beam parameter of the at least one beam based on the angle information.

23. The device of claim 22, wherein the at least one beam parameter includes at least one of a gain, a frequency, a phase, an amplitude, a direction, a width, an intensity, a power, a signal to noise ratio, a signal to interference plus noise ratio, an interference, an output energy, a variance, a correlation, an elevation angle, or azimuth angle.

24. The device of claim 22, wherein the at least one processor is further configured to control the at least one beam based on obstruction data related to at least one obstruction based on a current location.

\* \* \* \* \*